ized Information Extraction, 2011,

United States Patent
Goli et al.

(10) Patent No.: US 11,625,660 B2
(45) Date of Patent: Apr. 11, 2023

(54) MACHINE LEARNING FOR AUTOMATIC EXTRACTION AND WORKFLOW ASSIGNMENT OF ACTION ITEMS

(71) Applicant: ORACLE INTERNATIONAL CORPORATION, Redwood Shores, CA (US)

(72) Inventors: Balajose Goli, Telangana (IN); Elvis L. Dsouza, Udupi (IN); Rameshkumar Garikipati, Vijayawanda (IN); Padmakumar A. Nambiar, Bangalore (IN); Hemendra Pal, Jaipur (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 43 days.

(21) Appl. No.: 17/003,216

(22) Filed: Aug. 26, 2020

(65) Prior Publication Data

US 2022/0067618 A1    Mar. 3, 2022

(51) Int. Cl.
*G06Q 10/06*    (2012.01)
*G06Q 50/08*    (2012.01)
(Continued)

(52) U.S. Cl.
CPC ..... *G06Q 10/06316* (2013.01); *G06F 3/0482* (2013.01); *G06F 16/90332* (2019.01);
(Continued)

(58) Field of Classification Search
None
See application file for complete search history.

(56) References Cited

U.S. PATENT DOCUMENTS 7,234,140 B2    6/2007  Dortmans
7,720,703 B1    5/2010  Broughton
(Continued)

FOREIGN PATENT DOCUMENTS

EP    3026614 A1 *    6/2016    ....... G06Q 10/06311

OTHER PUBLICATIONS

Assal et al. Semantically-Enhanced Information Extraction, 2011, IEEEAC paper #1121 (Year: 2011).*
(Continued)

*Primary Examiner* — Shelby A Turner
*Assistant Examiner* — Matthew H Divelbiss
(74) *Attorney, Agent, or Firm* — Kraguljac Law Group, LLC

(57) ABSTRACT

Systems, methods, and other embodiments associated with automatic smart extraction and workflow assignment of action items are described. In one embodiment, a method includes extracting a set of candidate action items from text of a construction project manual; applying static rules to the candidate action items to distinguish valid and invalid candidate action items; evaluating each valid candidate action item with a first machine learning model to label the valid candidate action item either (i) a true action item or (ii) not a true action item; evaluating each true action item with a second machine learning model to allocate each of the true action items to a construction workflow class; and transmitting the set of true action items to a submittal exchange system to populate one or more workflows.

20 Claims, 9 Drawing Sheets

(51) Int. Cl.

| | |
|---|---|
| *G06N 20/00* | (2019.01) |
| *G06F 3/0482* | (2013.01) |
| *G06K 9/62* | (2022.01) |
| *G06F 16/9032* | (2019.01) |
| *G06F 40/205* | (2020.01) |
| *G06Q 10/0631* | (2023.01) |

(52) U.S. Cl.
CPC ......... *G06F 40/205* (2020.01); *G06K 9/6259* (2013.01); *G06N 20/00* (2019.01); *G06Q 10/063114* (2013.01); *G06Q 50/08* (2013.01)

(56) References Cited

U.S. PATENT DOCUMENTS

| | | | |
|---|---|---|---|
| 10,417,178 | B2 | 9/2019 | Dorairajan et al. |
| 11,120,364 | B1* | 9/2021 | Gokalp ............... G06N 20/00 |
| 2005/0262112 | A1 | 11/2005 | Moore |
| 2012/0158165 | A1 | 6/2012 | Bohm et al. |
| 2013/0007648 | A1* | 1/2013 | Gamon ............... G06Q 10/107 715/771 |
| 2019/0187958 | A1 | 6/2019 | Lee et al. |
| 2020/0411170 | A1* | 12/2020 | Brown ............ G06Q 10/063114 |

OTHER PUBLICATIONS

Jeff McJunkin / Plangrid, An Autodesk.Company; Automatic Submittal Log, pp. 1-6, 2019; downloaded on Oct. 9, 2019 from: https://www.plangrid.com/features/automatic-submittal-log/.

Marshall Wheel / Plangrid, An Autodesk.Company; Workflows, pp. 1-6, 2019; downloaded on Oct. 9, 2019 from: https://www.plangrid.com/features/workflows/.

Emily Lau / Skyose, Full PlanGrid Construction Management Software Review—All You Need to Know About PlanGrid; pp. 1-9, Sep. 23, 2018; downloaded on Oct. 9, 2019 from https://skyose.com/full-plangrid-review/.

Shing et al., Extracting Workflows from Natural Language Documents: A First Step, pp. 1-6, downloaded on Oct. 9, 2019 from: https://www.nrl.navy.mil/itd/chacs/sites/www.nrl.navy.mil.itd.chacs/files/pdfs/A14BPM_Shing_et_al.pdf.

Schumacher et al., Extracting and Enriching Workflows from Text, pp. 1-2, downloaded on Oct. 9, 2019 from: https://ieeexplore.ieee.org/abstract/document/6642484.

Jaskie et al., Positive and Unlabeled Learning Algorithms and Applications: A Survey, pp. 1-8, 2019 IEEE.

Oracle—Construction and Engineering, Oracle's Primavera Submittal Exchange Cloud Service, pp. 1-3, 2019.

* cited by examiner

MACHINE LEARNING FOR AUTOMATIC EXTRACTION AND WORKFLOW ASSIGNMENT OF ACTION ITEMS

FIELD

The systems and methods described herein relate to artificial intelligence computers and digital data processing systems for machine learning. More particularly, the systems and methods described herein relate to machine learning with the capability to automatically add to its integrated collection of facts and relationships and an adaptive system that can continuously adjust its rules in order to identify and categorize information within an input document.

BACKGROUND

A construction project manual is a detailed document with technical and functional details of requirements to be fulfilled to advance a building construction project. The construction project manual includes many construction action items—descriptions of context for future communications regarding particular aspects of the building construction project. These construction action items include, for example, text descriptions of expected submittals, requests for information (RFIs), requests for proposal (RFPs), closeouts, documents or other items for which actions may be performed by one or more team members assigned to the building construction project. But it is challenging to digitally extract and categorize construction action items from construction manuals for these digital uses. Simple parsing or copying of action items is not generally possible at least because construction manuals are natural language documents without strict standards as to how the document text is to be formatted. Other computerized processes for extracting and or categorizing construction action items are of limited utility because they are highly inaccurate. A computerized system or method to automatically and accurately extract and categorize action items from construction manuals for subsequent digital use is therefore desired.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
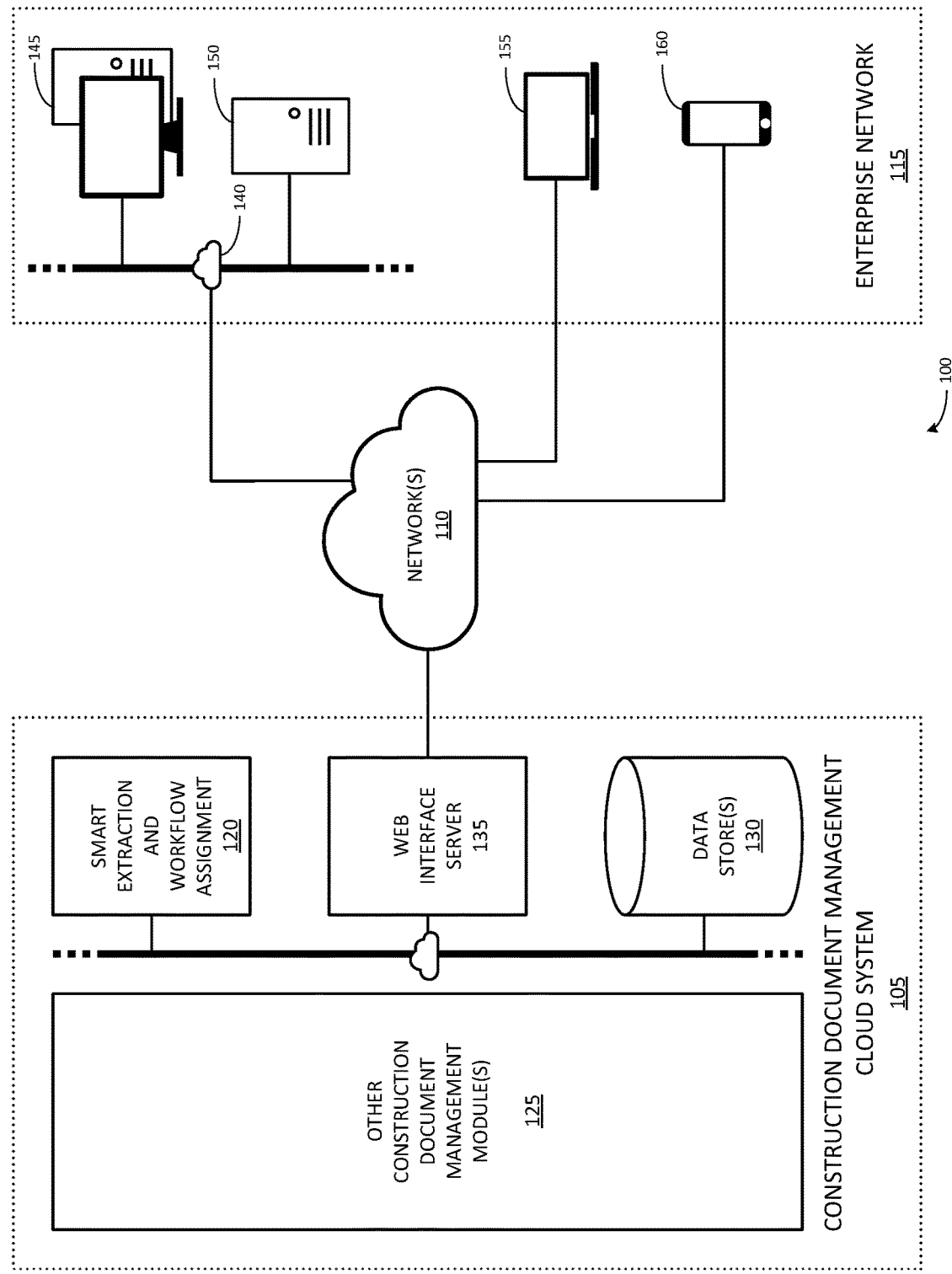
FIG. 1 illustrates an example environment associated with one embodiment of automatic smart extraction and workflow assignment of action items from construction project manuals.

In one embodiment, systems and methods are described herein that provide automatic smart extraction and workflow assignment of action items from construction project manuals. A construction project manual includes many construction action items—descriptions of context for future communications regarding particular aspects of the building construction project. The action items may also be thought of as topics or headings describing actions that may be taken or decisions that may be made during the course of the construction project. Digital versions of these construction action items can be digitally exchanged and reviewed in project management software systems. Advantageously, the systems and methods herein automatically extract digital action items from construction manuals and categorize them for use in project management software systems. In one embodiment, the systems and methods employ two self-learning classification techniques that learn from user actions to refine extraction of action items and assign the action items to appropriate construction workflows. For example, the systems and methods described herein present a novel automatic technique to extract digital construction action items from project manuals and select appropriate workflows to assign to them. A continuously self-learning module (such as a positive-unlabeled learning classification algorithm) is engaged to learn from user interaction to refine and filter items to reduce manual intervention in creating action items. The output of extraction module is further fed through another self-learning block to categorize or segregate action items (for example using a multi-class classification algorithm) into appropriate construction workflows, such as submittal, closeout, RFI, RFP, posting, design document, change order, punchlist, and other construction workflows. This selector block also uses configurable keywords to classify action items into workflows, enabling those action items that include the keywords to be classified directly into the workflows and bypass the machine learning classification.

Appropriate action item extraction expedites a digital construction project on-boarding process. The systems and methods described herein extract action items from project manuals and assign them to appropriate workflows with significantly improved accuracy compared to other computerized systems and methods. Further, the systems and methods described herein self-improve over time, while other computerized systems and methods for action item extraction do not self-improve.

In one embodiment, the systems and methods for smart extraction and assignment of action items involve various modules or components. For example, different modules involved in the smart extraction and assignment of action items include a basic extractor, a smart filter and selector (including a validator, digital filter, and workflow selector), and a results module or file. In one embodiment, the systems and methods described herein accept a project manual file and generate an action items file.

Construction project manuals are commonly in Adobe® portable document format (PDF) with text and/or pictures with text inside. In one embodiment, a basic extractor is responsible for getting a list of action items from the text of these documents. The basic extractor is implemented in different ways depending on the input type of the document. In one implementation of a basic extractor, construction project manuals with pictures are fed through Optical Character Recognition (OCR) to convert graphical images of text into encoded text (such as ASCII or Unicode text). In another implementation of a basic extractor, encoded text is extracted from construction project manuals that have encoded text and have no images. Using pattern matching, different action items are parsed from this text.

In one embodiment, a smart filter and selector module or component includes a validator, dynamic filter, and workflow selector that work together to produce digital action items for further use in project management systems. Static validations are done in the validator. Prior known information which are supposed to be matching are checked for by the validator. For example, section titles and section number are validated against each other to see if there are inconsistencies. If inconsistencies exist, validation may fail. Among the list of items in the result grid received from the validator, bad results are filtered out by the dynamic filter. A machine learning model is used to mark items as good/bad. This model learns from the feedback given from the results grid to improve over time. Another self-learning model is used to classify action items to workflows in the workflow selector. Every action item is tried and classified into some predetermined construction workflow classes such as submittal, RFI, RFP, closeout, etc. This model learns from feedback too. As the model sees more data and as action items get verified to be belonging to certain classes the output improves.

In one embodiment, results of the smart filter and selector are presented for confirmation in a graphical user interface (GUI). Output is produced in a user interface to enable edits which will be fed back to both of the self-learning modules for auto correction. Once the output is confirmed as to accurate identification of action items and workflow assignment(s) of the action items, these action items can be exported to a specified/desired format.

In one embodiment, the GUI presents a list of results and the options to (i) remove items that are incorrectly identified to be action items, and (ii) restore action items that are incorrectly identified as not being action items. As the user removes or restores an item, the user actions along with the item information are noted. Each item that was removed/restored is saved in a different format and this will be used as a feedback for the filtering and assignment models.

In one embodiment, the output can be displayed in a GUI that displays one or more rows with information for an extracted action item on each row, including a field for section number, section title, expected item, and a selectable action to remove or restore the action item. The output GUI can also display a selectable "import to project button" that finalizes or accepts the displayed results.

The systems and methods described herein enable automatic extraction and assignment of action items. A first self-learning module improves correctness of extraction as it continuously validates and smartly filters extracted action items. A second, additional selector self-learning block acts to appropriately classify extracted action items into different workflows. This greatly improves the accuracy and performance of digital extraction of categorized action items. For example, the use of the self-learning smart filter block improves the accuracy of extracted action items. Also, the computing performance of creating categorized action items is greatly improved by enabling single-pass operation—the automated selector or classifier avoids the need to parse a project manual multiple times to fetch action items for each workflow. Further, a last step of optional interaction as a quality check to the process flow enables the system to increase accuracy—making the solution smarter—for the next go around (for subsequent extractions) by feedback to the machine learning tools.

Note that the systems and methods described herein are various embodiments of computing systems and methods. No action or function described or claimed herein is performed by the human mind. An interpretation that any action or function can be performed in the human mind is inconsistent with and contrary to this disclosure.

Example Operating Environment

FIG. 1 illustrates an example environment 100 associated with one embodiment of automatic smart extraction and workflow assignment of action items from construction project manuals. In one embodiment, construction document management cloud system 105 is connected by one or more networks 110 to enterprise network 115.

In one embodiment, construction document management cloud system 105 is an application server system configured to implement construction document management software as a service to client devices of enterprise network 115. In one embodiment, enterprise network 115 may be associated with a business entity that is a customer using the software as a service. For example, the construction document management cloud system 105 may be configured to operate a suite of cloud-based tools (or mobile applications) for electronically exchanging, reviewing, and archiving construction communications, construction documents and other construction data, such as, for example, Oracle® Primavera Submittal Exchange Cloud Service or other submittal exchange services. Using these cloud-based tools, construction documents, and other construction data can be exchanged between computing devices associated with various users that are parties to a construction project, such as general contractors, subcontractors, engineers, architects, or consultants. For example, the cloud-based tools may enable the exchange, review, and archiving on a topic-by-topic basis. Both the Oracle® Primavera Submittal Exchange Cloud Service and other cloud-based construction document management tools can be improved by implementing the systems and methods described herein.

In one embodiment, construction document management cloud system 105 includes a smart extraction and workflow assignment module 120, other construction document management modules 125, data stores 130, and web interface server 135. In some embodiments, the components of construction document management cloud system 105 may be implemented on one or more different hardware systems and components, even though represented as single units in FIG. 1. For example, the construction document management cloud system 105 may be hosted on a distributed computing system made up of one or more servers. Generally, a server is a physical computer dedicated to providing data storage and an execution environment for one or more software applications or services intended to process and respond to (or 'serve') requests received from other computers that are in data communication with the server, for instance through a network such as network 110. The server, and the services it provides, may be referred to as the "host" and the remote computers, and the software applications running on the remote computers, being served may be referred to as "clients." In one embodiment, the hosts for the construction document management cloud system 105 are configured to support requests from clients in multiple enterprise networks 115, each of which enterprise networks 115 is associated with a distinct business enterprise, in a multi-tenant architecture.

In one embodiment, smart extraction and workflow assignment module 120 is configured (for example as described in further detail herein) to automatically identify, extract, and categorize action items included in a construction project manual submitted for such processing. For example, smart extraction and workflow assignment module 120 implements machine learning for collection and aggregation of data describing an action item and automatically creates action item data objects within for use by other construction document management modules 125 in a workflow. In one embodiment, the construction project manual may be submitted for such processing from a client device 115 though web interface server 135 by a user authorized to make such a submission. The resulting extracted, categorized action items are stored in data store 130 for use by other construction document management modules 125.

In one embodiment, other construction document management modules 125 include, for example, tools for organizing, distributing, and tracking construction documents, including action items. The other construction document management modules 125 may also include tools for reviewing, marking-up, editing, and making notes by users regarding construction documents, including action items. The other construction document management modules 125 may also include tools for status reporting or task assignment to users based on construction documents, including action items. The other construction document management modules 125 may also include tools for generating archives of construction project documents, including action items. The other construction document management modules 125 may also include tools for preparing workflows based on construction documents, including action items. Users associated with a project and having proper credentials may access one or more of these tools through a graphical user interface (GUI), for example a web-based GUI served by web interface server 135 and displayed to the users with a client device 115. Changes (including any form of update) to construction documents, including action items, is stored in data store 130 for further use by other construction document management modules 125.

In one embodiment, data stores 130 are configured to provide a repository for persistently storing and managing collections of data generated, accessed, and/or used by cloud system 105. In one embodiment, data stores 130 are operated by a database server, data storage server, or file server. In one embodiment, data stores 130 may be implemented using a network-attached storage (NAS) device or other dedicated server device. Data stores may be implemented with any suitable data storage technology, including structured query language (SQL)-based relational database management systems (RDBMS). In one embodiment, the data stores 130 may include a discrete, dedicated data store for operation of each of the smart extraction and workflow assignment module 120, the other construction document management modules 125, and the web interface server 135, as well as a discrete, dedicated data store for administration of the cloud system 105.

In one embodiment, client computing systems (such as those of enterprise network 115) may access information or applications provided by the construction document management cloud system 105 through web interface server 135. For example, the client computing systems may initiate, accept, or provide inputs to, perform portions of, or receive results from operation of the systems and methods described herein. In one example, web interface server 135 includes a web server. A web server may be a combination of hardware and the software that delivers content, commonly by hosting a website, to client web browsers that access the web server via the Internet. In one embodiment, the remote computing system may send requests to and receive responses from web interface server 135. In one example, access to the information or applications may be effected through use of a web browser configured to access the construction document management cloud system 105 executing on a client computing system. In one example, access to the information or applications may be effected through use of dedicated client software configured to access the construction document management cloud system 105 executing on a client computing system. In one example, communications between web interface server 135 and the client devices of enterprise network 115 may take the form of remote representational state transfer (REST) requests using JavaScript object notation (JSON) as the data interchange format for example, or simple object access protocol (SOAP) requests to and from XML servers.

In one embodiment, network(s) 110 may include electronic communication networks utilizing wired and/or wireless communication technologies and networks operating in accordance with any suitable networking and/or communication protocol (e.g., the Internet).

In one embodiment, enterprise network 115 may include various client devices configured to execute client applications that interact with construction document management cloud system 105. For example, enterprise network 115 may include an on-site, wired or wireless local area network (LAN) 140 to which client devices such as one or more computers 145 (such as a personal, workstation, notebook, laptop, or tablet computer; personal digital assistant (PDA); or smart phone) and/or server computers 150 are operably connected. Also, enterprise network 115 may include client devices such as one or more remote computers 155 (such as a personal, workstation, notebook, laptop, or tablet computer; server computer; PDA; or smart phone) operably connected to enterprise network 115 through network(s) 110. Also, enterprise network 115 may include client devices such as one or more cellular/mobile devices 160 (such as a smart phone, tablet computer, or notebook/laptop computer including cellular/mobile data connection hardware) that are connected to the enterprise network 115 through network 110 and cellular/mobile communications networks. Cellular/mobile devices 160 may be configured with a mobile client application for construction document management cloud system 105 that is specifically adapted to the hardware and/or software features of cellular/mobile devices 160, as compared with computers 145, 155.

Example Workflow

Figure 2:
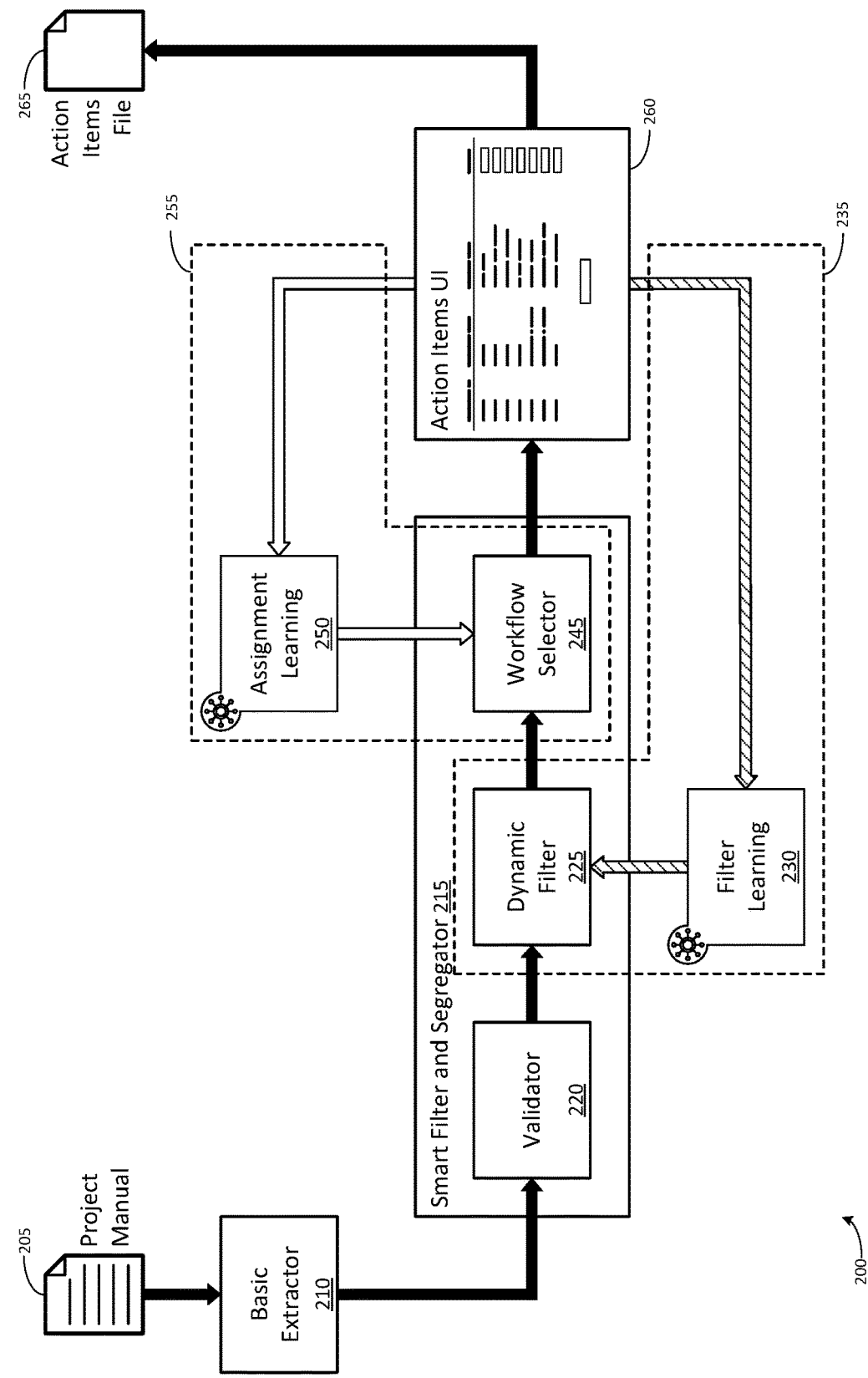
FIG. 2 illustrates an example process flow diagram associated with one embodiment of automatic smart extraction and workflow assignment of action items from construction project manuals.

FIG. 2 illustrates an example process flow diagram 200 associated with one embodiment of automatic smart extraction and workflow assignment of action items from construction project manuals.

In one embodiment, a project manual 205 is provided for automatic extraction and assignment of action items that the project manual 205 contains. A construction project manual (such as project manual 205) is a set of documents related to the construction work on a building construction project. The construction project manual includes technical specifications document(s), often along with sample documents, bidding requirements, and conditions of contract.

The construction project manual may be written to follow a standardized format for organizing the information contained in the construction project manual. For example, one such format typically used in North America is the MasterFormat® specifications-writing standard promulgated by the Construction Specifications Institute (CSI) and Construction Specifications Canada (CSC). The standard lists section numbers and associated section titles for organizing data about construction requirements, products, and activities. These section titles and section numbers provide a uniform category for each type of requirement, product, and activity that makes up a construction project. The categories may be further grouped hierarchically within more general divisions. A construction project manual written in compliance with the standardized format will associate natural-language descriptions of the requirements, products, and activities related to a category with the relevant section titles and/or section numbers, for example by using the section title and/or section number as a heading for the natural-language description in the construction project manual. The natural-language descriptions indicate the details of performance to satisfactorily complete requirements, products, and activities related to the associated sections, and in total, all the natural language descriptions explain how to satisfactorily complete the construction project.

For example, section number 05 15 19, entitled "Stainless-Steel Wire Rope Assemblies," falls within Division 5, "Metals" in the MasterFormat® standard. A construction project manual written in compliance with that standard for a building project that includes Stainless-Steel Wire Rope Assemblies will describe the requirements, products, and activities related to such assemblies under the section number 05 15 19 and title "Stainless-Steel Wire Rope Assemblies."

The natural language description may also describe particular documents and/or samples to be provided for review or discussion by project personnel. These documents and/or samples may be referred to as submittals, which are one type of the action items herein. The submittals include, for example, shop drawings, material data, product data, product specifications, product samples, operation and maintenance (O&M) data, maintenance certificates (and other certificates), warranty documents, contracts, and a wide variety of other construction-related documents. The action items described by natural language associated with a section relate to requirements, products, and activities associated with that section.

In one embodiment, the construction project manual may not be written to conform to any particular standard. In this case, section numbers and titles confirming with the standard may be extrapolated from keyword matches within the natural language description of an action item.

In one embodiment, project manual 205 is a file or set of files including text and/or pictures with text. For example, project manual 205 may be a series of one or more digital images of paper construction manual documents generated by capturing the paper documents with a document scanner or a digital camera. In one embodiment, digital images that make up project manual 205 may include one or more of a PDF file, a tagged image file format (TIFF) file, joint photographic experts group (JPEG) file, portable network graphics (PNG) file, or other graphics file. In one embodiment, project manual 205 may be a digital file format that encapsulates a description for representing digital text and images in a fixed-layout (paper-like) format, such as a PDF file or XML Paper Specification (XPS) file.

In one embodiment, smart extraction and workflow assignment module 120 generates a project manual upload GUI for presentation on a computer (such as computer 145 or remote computer 155) of enterprise network 115. The upload GUI may include an HTML form to upload project manual 205. The HTML form may include a file input field that allows a user of computer 145 (or 155) to navigate to a hard drive location and select a file, and a button that executes a post method to transmit the selected file through network 110 to web interface server 135. The upload GUI is transmitted by web interface server 135 to computer 145 (or 155) through network(s) 110 in response to a request received from computer 145 (or 155). A user may operate the GUI to select a project manual 205 file stored locally on computer 145 (or 155), or on other computers within enterprise network 115, and upload it to construction document management cloud system 105. The project manual 205 file is received by web interface server 135 and saved to data store 130. Smart extraction and workflow assignment module 120 is notified of the project manual 205 file location within data store 130.

In the context of a construction document management cloud system 105, the users of such a system may wish to view those construction communications, construction documents, and other construction data that are relevant to a specific category of requirement, product, or activity in a construction project workflow. Accordingly, each action item may be displayed grouped by sections (or other category definitions) in a construction project workflow graphical user interface. To enable presentation of a construction project workflow in this manner, action items—such as expected submittal documents—can be derived from the uploaded construction project manual file 205 stored within data store 130.

To develop this construction project workflow, action items for the categories, as well as types of submittal documents that are expected in order to satisfy or advance the action item can be derived from the uploaded construction project manual file 205 stored within data store 130. These action items and expected types of submittal documents may then be provided as output to other construction document management modules 125 as a basis to configure a document exchange for a construction project described by the project manual 205. In one embodiment, each action item retrieved from the project manual file 205 will have a corresponding entry in the document exchange. In one embodiment, there is a one-to-one relationship between an action item and an expected submittal document—each expected submittal document is uniquely associated with at least one action item.

Thus, each of these action items (such as submittals, closeouts, RFIs, RFPs, postings, design documents, change orders, or punchlist items) may be considered to be a topic for discussion or conversation point to advance the construction project.

In one embodiment, basic extractor 210 is a module configured to extract (or gather or retrieve) a list of action items from a project manual file such as project manual file 205. Basic extractor 210 may access project manual file 205 from a storage location in data store 130.

In one embodiment, basic extractor 210 retrieves a list of action items from the text of construction project manuals, such as project manual file 205. In one embodiment, basic extractor 210 accepts project manual file 205. Project manual file 205 may be provided to basic extractor 210 in response to a request to load project manual file 205 from a location in data store 130 where project manual file 205 was written after being uploaded. In one embodiment, the request is made by basic extractor 210 in response to a user indication that action items are to be acquired from project manual file 205.

In one embodiment, basic extractor 210 parses project manual file 205 to determine if it includes encoded text elements, for example by detecting text strings as operands of the Tj or TJ operator in a PDF version of project manual file 205. If project manual file 205 includes encoded text elements, the text strings are extracted—identified, copied, and written to an output text document. If project manual file 205 does not include encoded text elements, an optical character recognition (OCR) process is executed on the project manual file 205 to convert images of print text into machine-encoded text, and write that text to an output text document. Regardless of the form taken by this initial text retrieval, the output text document is placed in data store 130. In one embodiment, the output text document is a simple stream of text characters.

In one embodiment, basic extractor 210 then uses pattern matching rules to parse action item candidates out of the output text extracted from project manual file 205. A set of pre-configured pattern matching rules may be retrieved from data store 130. For example, basic extractor 210 performs syntax analysis on the output text document to determine portions of the text stream that satisfy patterns consistent with the presence of an action item. In one embodiment, advantageous use is made of the standardized specifications-writing format that the project manual file 205 may follow. For example, the format may specify that items mentioned at a particular location within the document is an action item. One or more pattern matching rules that identify action items based on location within a document may be included in the set of pattern matching rules. Even if the document does not precisely follow the standardized format, or if action item descriptions are present at other locations within project manual file 205, the candidate action items will be recognized by pattern matching. Pattern matching rules that capture action items in other locations within the output text gathered from project manual file 205 may be included in the set of pattern matching rules. In one embodiment, basic extractor 210 uses the pattern matching rules to identify as action item candidates those combinations of text within the output text that appear to describe an action item. The pattern matching rules are configured to detect descriptions of various types of action items within the output text, for example, shop drawings, material data, product data, product specifications, product samples, O&M data, maintenance and other certificates, warranty documents, contracts. In one embodiment, the pattern matching rules may be written using Java® regular expressions.

In one simple example, a pattern matching rule to identify a product data submittal in the extracted text could be written to find instances of the string "data sheet." For each identified action item candidate, the basic extractor 210 identifies a section number and section title of the project manual in which the action item candidate is found. The basic extractor 210 writes the identified section number, identified section title, and type of action item (expected item) to a data structure. For example, basic extractor 210 may generate a list of possible or candidate action items extracted from the project manual file 205.

In one embodiment, where an express section number and section title are not present for a particular likely action item, the basic extractor may extrapolate or estimate the section number and section title based on the presence of certain keywords related to the section that appear proximate to the action item in the construction project manual. This situation may arise when the construction project manual is not written in compliance with a specifications-writing standard.

In one embodiment, the type of action item is recorded as an expected item that will be a subject of the action described by the action item. For example, the expected item may be a construction document or submittal. In another example, the expected item may be comments or approvals by construction project team members.

In the list of candidate action items, basic extractor 210 may record each candidate action item as a candidate action item object with populated fields for section number, section title, and for expected item of the candidate action item. In one embodiment, the candidate action item objects include a description text field for additional information extracted from the project manual file 205 describing the action item. Basic extractor 210 may populate this description field with the text from the project manual file that basic extractor 210 determined to be or to include the candidate action item. The candidate action item objects may also have a field for a flag or label indicating whether the candidate action item object is a true positive or false positive and a field for a construction workflow class, which are left unpopulated by basic extractor 210. The list or set of candidate action items extracted from the project manual file 205 is written to data store 130, for example as a table data structure of candidate action item object row data structures, for further processing.

In one embodiment, the functions of basic extractor 210 are included in smart extraction and workflow assignment module 120, and may be executed by the computing system(s) hosting smart extraction and workflow assignment module 120 of construction document cloud system 105.

In one embodiment, smart filter and selector 215 removes false positive action item candidates and further flags the remaining candidate action items as either true or false positives for further review, and then categorizes the true positive action item candidates by the type of destination workflow that they will be added to. In one embodiment, smart filter and selector 215 includes three sequential process modules to perform these three functions in sequence: validator 220, dynamic filter 225, and workflow selector 245. When executed, these modules work together to produce digital action items for further use in project management systems from extracted candidate digital action items.

In one embodiment, validator 220 performs static validations of the action item candidates. Validator 220 checks each candidate action item to determine whether or not the candidate action item conforms to a preset list of rules. The validation performed by validator 220 is 'static' in the sense that the rules do not automatically change or adjust due to feedback (and are not automatically adjustable by feedback), but are instead fixed rules. In other words, the rules used in static validation are not adaptive or part of a machine learning feedback loop. Instead, fixed known information expected to be matching is checked. Validator 220 then determines whether there is an inconsistency between the values of the candidate action item object and the known information. If an inconsistency exists, validation may fail for the candidate action item object. Validator 220 removes—deletes—the candidate action item object that fails validation from the candidate set. If validation rules are satisfied for the action item object, validation succeeds, and the candidate action item object remains in the candidate set.

Recall that the project manual file 205 is written in accordance with a specifications-writing standard. Validator 220 may remove candidate action items that are inconsistent with extraction from a document composed in accordance with the specifications-writing standard. In one example, a candidate action item is extracted out of a section within a construction project manual. The section number and section title are also extracted and included in the candidate action item object for this. In this example, the specifications-writing standard dictates that all section numbers are six-digit numbers. So, validator 220 applies a rule consistent with that requirement and will remove each candidate action item row that includes a non-six-digit section number. Also, the specifications-writing standard may not include any section number with a leading digit of 5 or higher. Here, validator 220 applies a rule consistent with this feature of the specifications-writing standard and will remove each candidate action item row that includes a section number that begins with a digit of 5 or higher. Further, the specifications-writing standard may dedicate certain section numbers to sections that do not include action items, for example, section numbers starting with 00 and 01. Validator 220 applies a rule consistent with this aspect of the specifications-writing standard and will remove each candidate action item row that includes a section number starting with 00 or 01. Additionally, extracted section titles and section numbers of each candidate action item object are checked against a golden (that is, known to be accurate, or at least treated as authoritative by the system) master list of section title and section number pairs. This master list may be defined by or consistent with the specifications-writing standard. An extracted section title associated with an extracted section number should match the section title and section number pair provided in the master list. Validator 220 applies a rule consistent with this aspect of the specifications-writing standard and will remove each candidate action item row that includes an extracted section number—section title pair that is inconsistent with the master section number—section title pair.

These deletions are appropriate because valid action items are only found within valid sections of the construction project manual, and further only found where action items should be placed. Candidate action items extracted by basic extractor 210 but not satisfying these rules can therefore be discarded by validator 220 as false positives. Such candidate action items may be assumed to be incorrect because they are not consistent with extraction from a document composed in accordance with the specifications-writing standard.

In one embodiment, validator 220 can also execute other static preprocessing functions. For example, validator 220 may modify extracted information to conform to a standard. For example where an extracted section number in a candidate action item row is only 5 digits, validator 220 may execute a rule to insert a leading zero into the section number, and upon confirming that the updated section number—section title pair is consistent with the corresponding pair in the master list, retain the candidate action item row rather than deleting it. Note that—as with the 'leading zero insertion' rule—rules may be conditional based on the content of the candidate action item object, and may not be applied fully if one or more preconditions fail. Other static preprocessing, such as deduplication, may also be performed by validator 220.

The foregoing are only selected, simple examples of static validation operations performed by validator 220. In one embodiment, the static validation operations performed by validator 220 are extremely complex parsing rules. Other operations that can be performed by application of a static rule to the information contained in the candidate action item rows (or overall table) can also be performed by validator 220—keyword search, comparison and matching, and Boolean operations. In one embodiment, the operations performed by validator 220 include static parsing rules for application to the candidate action item rows.

In one embodiment, static validator 220 retrieves from data store 130 the list of candidate action items, a set of one or more static validation rules, and if necessary, prior known information used in the execution of the static validation rules (such as a master list of section number—section title pairs). For each candidate action item row in the list of candidate action items, static validator 220 executes each static validation rule in the set of validation rules. If a candidate action item row fails any static validation rule in the set of validation rules, that candidate action item row is deleted from the list of candidate action items. Once all candidate action item rows that failed validation are removed or purged from the list of candidate action items, the updated list of candidate action items containing only candidate action item rows that pass all validation rules is stored in data store 130 for further processing.

In one embodiment, the functions of validator 220 are included in smart extraction and workflow assignment module 120, and may be executed by the computing system(s) hosting smart extraction and workflow assignment module 120 of construction document cloud system 105.

Static validation has inherent limitations on accuracy. Static validation of extracted action items can only be made, at best, to result in about 60-65% true positive candidate action items, with about 35-40% false positive candidate action items. More restrictive static rules could increase the ratio of true positive to false positive candidate action items, but only by unacceptably excluding true positives (that is, false negative, type II errors). Dynamic filtering is introduced that overcomes these accuracy limitations.

In one embodiment, dynamic filter 225 is configured to label extracted candidate action items as either true action items (true positive) or not true action items (false positive)

to enable further removal of false positives. These true positive/false positive statuses are identified by a machine learning model, filter learning model 230, trained to identify actual action items among the extracted candidates. The labels are applied in response to the determination by filter learning model 230. The labels either (i) confirming that a candidate action item is an actual (true) action item, or (ii) indicating that a candidate action item is not actually an action item facilitate removal of the false positive action items from the list of extracted action items. In one embodiment, dynamic filter 225 or filter learning model 230 writes the labels or flags to the field in the candidate action item objects designated for the label indicating whether the candidate action item object is a true positive or false positive.

In one embodiment, dynamic filter 225, and its associated filter learning model 230 make up the first of two non-static, machine learning blocks in the process flow 200—filter learning block 235. In one embodiment, filter learning model 230 is a machine learning model that learns from training sets and user feedback. Filter learning model 230 is provided with user feedback as to whether its previous determination of whether a candidate action item is a true action item or not was rejected by the user, as indicated by user change or correction to the determination. In one embodiment, when filter learning model 230 receives an indication that a previous determination was corrected, filter learning model 230 may be further trained with the candidate action item object with the user-corrected label of true or false positive in order to improve the accuracy of dynamic filter 225, and to improve the overall accuracy of automatically extracted action items. Thus, the filter learning model 230 directing the output of dynamic filter 225 continues improving based on how the user reacts to the output produced by the dynamic filter 225.

In one embodiment, filter learning model 230 performs one-class classification of the candidate action items into a 'true action item' class, with the remainder of candidate action items being in a 'not true action item' class by default. But, because there is no complete description of 'not true action item,' all training data is positive, 'true action item' data. As there is just one type of data which is known to be positive, but no knowledge of what constitutes the negative data, in one embodiment, filter learning model 230 performs a particular type of one-class classification learning known as 'positive-unlabeled learning.' The unlabeled data may include both positive and negative data. In one embodiment, filter learning model is trained on a dataset including both positive 'true action item' candidate action item objects and unlabeled candidate action item objects that may be either 'true action items' or 'not true action items. After training, the trained filter learning model 230 (or the parameters defining the trained state of filter learning model 230) are stored as a data structure in data store 130.

In one embodiment, dynamic filter 225 accesses a machine learning model employing a positive-unlabeled learning classification algorithm that is trained to classify candidate action item objects as either belonging to the set of true action items, or not belonging to that set, such as filter learning model 230, and retrieves the updated list of candidate action items containing only candidate action item rows that pass all validation rules generated by validator 220 from data store 130. For each candidate action item object in the updated list of candidate action items in turn, dynamic filter 225 provides the candidate action item object to filter learning module 230. Filter learning module 230 evaluates whether the candidate action item object is truly an action item, and labels the candidate action item object as a 'true action item' or 'not a true action item' based on the result of the evaluation. For example, learning module 230 writes the labels to a true/not true action item label field in the candidate action item object. This label may be a simple flag. Filter learning module 230 returns the labeled candidate action item object to dynamic filter 225. Dynamic filter 225 stores the labeled candidate action item object in data store 130 in the list of candidate action items.

In one embodiment, the functions of dynamic filter 225 and filter learning module 230 are included in smart extraction and workflow assignment module 120, and may be executed by the computing system(s) hosting smart extraction and workflow assignment module 120 of construction document cloud system 105. Configuration data for filter learning module 230 may be stored as a data structure in data stores 130.

In one embodiment, workflow selector 245 is configured to categorize or assign an action item (such as an extracted candidate action item) into a class of construction workflow. A construction workflow describes the process that should be followed for the action item over the course of the construction project. The construction workflow dictates how the action item and or the expected item (such as a document) associated with the action item should flow through and be handled by various parties of a construction project team. The construction workflow describes which party is responsible for taking action at each step in the construction workflow. In one embodiment, the parties of the construction project team may include General Contractors, Subcontractors, Architects, Consultants, Owners/Customers, and/or Project Financers/Banks. Classes of construction workflow are generally based on overall purpose of the workflow, for example, evaluating submittals, fulfillment of a request for information (RFI) or request for proposal (RFP), obtaining permits, or completing inspections or closeout. There may be a wide variety of additional workflow classes beyond these examples. Construction document management cloud system 105 may include various pre-configured classes of workflows. The workflow classes may be standard workflows, or may be workflows custom-configured by a user of construction document management cloud system 105. In one embodiment, an example set of standard workflows is given by Table 1.

TABLE 1

| Example Standard Workflows | | |
| --- | --- | --- |
| Workflow Class Name | Typical Approvals Flow | Description |
| Submittal | Subcontractor → General Contractor → Consultant → Architect → General Contractor/Subcontractor | Review log starting with Contractor, with action codes (Submittals or similar) |

TABLE 1-continued

Example Standard Workflows

| Workflow Class Name | Typical Approvals Flow | Description |
| --- | --- | --- |
| Closeout | Subcontractor → General Contractor → Consultant → Architect → General Contractor/Subcontractor | Review log starting with Contractor, with action codes (Closeouts or similar). Design team can use construction team files directly. |
| Request for Information (RFI) | Subcontractor → General Contractor → Consultant → Architect | RFIs are the formal Q&A process for construction. |
| Request for Proposal (RFP) | Consultant → Architect → Subcontractor → General Contractor → Architect | RFPs include price quotes and other information for potential changes. |
| Posting Only | No approvals | Used for any document that needs to be distributed or tracked, such as architect's supplemental instruction (ASI), Bulletin, Meeting Minutes, or similar documents. |
| Design Documents | No approvals | Design posting log, no review (Design Documents, Planroom, Drawings, Specs or similar). |
| Change Order | Architect (optional) → General Contractor → Consultant → Architect | Change Orders are the official instruction (with General Contractor, Architect, and Owner signatures) to proceed with new work. |
| Punchlist | Action item on assigned user | For observed jobsite items to be assigned and get fixed. User guided assignment log (Punchlist, Issue Management or similar) |

The typical approval flows described in Table 1 may be customized to meet the needs of the construction project. Additional custom workflows may be included beyond the examples given in Table 1.

Construction document management cloud system 105 directs provision and review of information for an action item to the responsible or authorized parties (or individuals) in accordance with the workflow class assigned to the action item. Thus, the workflow class assigned to the action item governs the steps or tasks for handling information about the action item in construction document management cloud system 105. Accordingly, workflow selector 245 further allocates extracted action items to a construction workflow class. For example, workflow selector 245 may classify each action item in the list of candidate action items into some predetermined construction workflow classes such as RFI, RFP, closeouts, questions and answers, inspection items, etc. In one embodiment, each extracted action item received by workflow selector 245 is assigned a workflow class by workflow selector 245. In one embodiment, workflow selector 245 assigns a workflow class to some, but not all of the extracted action items received by workflow selector 245. In one embodiment, workflow selector 245 may assign multiple workflow classes to an action item. In one embodiment, workflow selector 245 may assign no workflow class, one workflow class, or multiple workflow classes to each action item received by workflow selector 245. For example, erroneously identified action items may fail to be assigned to any workflow class by workflow selector 245. Or, for example, an action item such as a warranty may be assigned to multiple workflows, such as to a submittal workflow and an RFP workflow.

In one embodiment, construction workflow class for an extracted candidate action item is identified by a machine learning model, assignment learning model 250, trained to identify the construction workflow class to which the action item should be assigned. The candidate action items are assigned the construction workflow class determined by assignment learning model 250. The assignment enables the action items to be pre-assigned a category upon import to construction document management cloud system 105. In one embodiment, workflow selector 245 or assignment learning model 250 writes the identified construction workflow class for a candidate action item to a field in the candidate action item object designated for holding a construction workflow class.

In one embodiment, workflow selector 245, and its associated assignment learning model 250 make up the second of two non-static, machine learning blocks in the process flow 200—assignment learning block 255. In one embodiment, assignment learning model 250 is a machine learning model that learns from training sets and user feedback. Assignment learning model 250 is provided with user feedback as to whether its previous classification of a candidate action item into a particular construction workflow class among a set of possible construction workflow classes was rejected, as indicated by user change or correction to the classification. In one embodiment, when assignment learning model 250 receives an indication that a previous classification was corrected, assignment learning model 250 may be further trained with the candidate action item object with the user-corrected construction workflow class in order to improve the accuracy of workflow selector 245, and to improve the overall accuracy of assignment of action items into construction workflow classes. Thus, the assignment learning model 250 directing the output of workflow selector 245 continues improving based on how the user reacts to the output produced by the workflow selector 245.

In one embodiment, assignment learning model 250 performs multi-class classification of the candidate action items into one construction workflow class in a set of construction workflow classes. Assignment learning model 250 may implement one or more of various machine learning algorithms suitable for multi-class classification, including, for example, support vector machines, neural networks, decision trees, k-nearest neighbor, and naïve Bayes algorithms. In one embodiment, assignment learning model 250 is trained on a dataset including action items assigned to each discrete construction workflow class in the set of construction workflow classes. After training, the trained assignment learning model 250 (or the parameters that define the trained state of assignment learning model 250) are stored as a data structure in data store 130.

In one embodiment, action items may be classified into only one of several construction workflow classes. In another embodiment, action items may be classified into more than one of the several construction workflow classes at the same time. In one embodiment, all action items from the same section of the construction project manual (that is, all action items having the same section number and/or section title) may be classified into the same workflow. Assignment learning model 250 may be trained to perform each of these types of classification. In one example, Assignment learning model 250 is trained so that all action items from 20 example sections should be added to example workflow 1, while all action items for 15 of those 20 example sections should also be added to example workflow 2, and 10 of those 20 example section should also be added to example workflow 3. Assignment learning model 250 will make those classifications in one pass, rather than multiple passes for each separate workflow. This improves the efficiency of the computer making the classifications because it eliminated operations required for discrete operations for each of the three example workflows.

In one embodiment, workflow selector 245 may also use configurable keywords to classify items into workflows, bypassing classification by assignment learning model 250. (The term "keyword" is used loosely, and may refer to a single word as well as a phrase made up of multiple words.) In some situations, the presence of a particular keyword in a candidate action item dictates placement of that action item into a particular construction workflow class. For example, the keyword may be detected in the section title field, the expected item field, or the description field of the candidate action item object for the candidate action item. Accordingly, a list or set of keyword—construction workflow class pairs can be used to map keywords to a construction workflow class. This list may be configured by a user or administrator of the system in advance of the extraction process, and may be stored in and loaded from a file in data stores 130. The workflow selector 245 is configured to strictly assign candidate action items including a keyword in the list to the construction workflow class paired with that keyword in the list. Thus, the user or administrator can require that a candidate action item mentioning a keyword always be assigned a particular workflow class. This serves as a way to override the dynamic nature of assignment learning block 255.

In one embodiment, workflow selector 245 accesses a machine learning model employing a multi-class classification algorithm that is trained to classify candidate action item objects as either belonging to one of several construction workflow classes, such as assignment learning model 250, and retrieves the list of labeled candidate action items (that is, the output of dynamic filter 225 where the candidate action items are labeled as either a true action item or not a true action item) from data store 130. In one embodiment, workflow selector 245 additionally loads a list of keyword—construction workflow class mappings. In one embodiment, for each workflow selector 245 parses each candidate action item object in the list of labeled candidate action items to identify keywords, and determines whether any of the keywords in the list are present in the candidate action item object. If a listed keyword is present, the workflow selector 245 applies the construction workflow class paired with the keyword to the candidate action item object, and bypasses assignment learning model 250. If no keyword in the list is present, the workflow selector 245 provides the candidate action item object to assignment learning model 250. Alternatively, in one embodiment where there is no list of keyword—construction workflow class mappings, for each candidate action item object in the list of labeled candidate action items in turn, workflow selector 245 provides the candidate action item object directly to assignment learning model 250 without first checking for the presence of listed keywords. Assignment learning model 250 determines a construction workflow class to assign the candidate action item object to, and applies this workflow class to the candidate action item object. For example, assignment learning model 250 writes the identified construction workflow class to the field in the candidate action item object. In the event that the action item is assigned to multiple construction workflow classes, the multiple classes can be written to the field in the candidate action item object as an array or other similar data structure. Assignment learning model 250 returns the classified candidate action item object to workflow selector 245. Workflow selector 245 stores the classified candidate action item object in data store 130 in the list of candidate action items.

In one embodiment, the functions of workflow selector 245 and assignment learning model 250 are included in smart extraction and workflow assignment module 120, and may be executed by the computing system(s) hosting smart extraction and workflow assignment module 120 of construction document cloud system 105. Configuration data for assignment learning model 250 may be stored as a data structure in data stores 130.

In one embodiment, action items user interface 260 is configured to present results of the smart filter and selector 215 for confirmation in, and accept corrective user inputs from, a graphical user interface. For example, the results may be presented as a "results grid" of all action item objects received from workflow selector 245, although the results grid may be subdivided into multiple pages for convenience of presentation. In one embodiment, action items user interface 260 presents a list of results—candidate action items—and the options to (i) remove candidate action items that are incorrectly identified to be action items, and (ii) restore candidate action items that are incorrectly identified as not being action items, such as candidate action item review GUI 300 shown and described with reference to FIG. 3. In one embodiment, action items user interface 260 presents a list of results and the options to change the construction workflow class assigned to each candidate action item in the list, such as workflow classification review GUI 400 shown and described with reference to FIG. 4.

In one embodiment, corrective changes input by the user to remove a candidate action item incorrectly labeled 'true action item' cause the action items user interface 260 to relabel the candidate action item as 'not a true action item' in the label filed of the associated action item object. Similarly, corrective changes input by the user to restore a candidate action item incorrectly labeled 'not a true action item' cause the action items user interface 260 to relabel the candidate action item as a 'true action item' in the label filed of the associated action item object. In one embodiment, corrective changes input by the user to assign a new (that is, different) construction workflow class to a candidate action item cause the user interface 260 to change the value in the construction workflow field of the associated action item object to the new class. In one embodiment, the changes will be stored in response to user input indicating final acceptance of the user-input changes.

In one embodiment, the corrective user inputs are used to further train the machine learning models. This training feedback improves the accuracy of filter learning model 230, assignment learning model 250, or both of these machine learning models for subsequent operation of the models, but does not affect current results.

Following a correction to the construction workflow class of a candidate action item, the updated action item object associated with that action item (incorporating the changed value in the construction workflow field) is returned to the assignment learning model 250. The assignment learning model 250 is then further trained using that updated action item object.

Following a 'restore' user input to change the label of a candidate action item from 'not a true action item' to a 'true action item,' the updated action item object associated with that action item (incorporating the change to "true action item" in the label field) is returned to filter learning model 230. The filter learning model 230 is then further trained using that re-labeled action item object. In one embodiment, no further training of filter learning model 230 occurs following a correction to change the label of a candidate action item from a 'true action item' to 'not a true action item' due to the positive-unlabeled approach to learning employed by filter learning model 230. In other words, while the boundaries of what is a true action item (positive data) can be expanded to capture additional true action items in the future, the boundaries of what is not a true action item cannot be further expanded without risking capturing true action items (positive data). The filter learning model 230 can improve its understanding of what true action items (positive data) look like through training based on user-input 'restore' actions, but filter learning model 230 does not further delimit not-true action items (negative data). Every 'restore' action refines the parameters of what is a true action item.

In one embodiment, action items user interface 260 accesses the list of assigned candidate action items (that is, the output of workflow selector 245 where the candidate action items are categorized into construction workflow classes) from data store 130. Action items user interface 260 generates a results grid of all action item objects in the list of candidate action items, including user interface elements configured to accept user input to change (i) whether an action item is truly an action item or not, (ii) the construction workflow class assigned to the candidate action item, or (iii) both (i) and (ii). In one embodiment, action items user interface 260 generates a candidate action item review GUI (such as GUI 300 shown and described with reference to FIG. 3) for presentation on a computer in enterprise network 115. In one embodiment, action items user interface 260 generates a workflow classification review GUI (such as GUI 400 shown and described with reference to FIG. 4) for presentation on a computer in enterprise network 115.

In one embodiment, the functions of action items user interface 260 are included in smart extraction and workflow assignment module 120, and may be executed by the computing system(s) hosting smart extraction and workflow assignment module 120 of construction document cloud system 105.

In one embodiment, operation of the process described by process flow diagram 200 yields action items file 265 as a result. Action items file 265 may be a data structure in data stores 130. Action items file 265 includes all extracted action items that remain un-deleted and un-removed following the operation of (i) smart filter and selector 215 (statically validating, dynamically filtering, and categorizing into workflow classes) the extracted action items and (ii) review and correction in action items UI 260. There is at least one action item created in action items file 265 for each of these "passed" candidate action items. In one embodiment, action items file 265 is a list or table of such action item objects.

The data structure of action items in action items file 265 may differ from the data structure of candidate action item objects processed in process flow 200. The action item data structure may be an action item object that includes fields for section number, section title, expected item, and construction workflow class. The values of these fields in an action item object may be copied directly from the fields of the same name in the corresponding candidate action item object. Values of fields of candidate action item objects used only in the extraction, validation, filtering, assignment, and review process shown in process flow diagram 200 are not included in the action item objects created in action items file 265. These values that may be discarded include the value of the true/false positive flag and the value of the description text field in the candidate action item objects because, in one embodiment, they are not used by other construction document management modules 125 (not used outside of smart extraction and workflow assignment module 120).

In one embodiment, additional fields are included in the action items that may be used by other construction document management modules 125. For example, such fields may include one or more event fields describing events related to the action item, one or more date fields describing dates events occurred or are planned to occur that are related to the action item, document fields for links to documents related to the action item, or other information related to the action item. These fields are not populated during the creation of action items file 265, but are instead placeholders for information that may be generated by other construction document management modules 125.

In one embodiment, the creation of action items file 265 is initiated in response to user selection of an "accept" or "import" button presented by action items UI 260. In one embodiment, the creation of action items file 265 is automatically initiated in response to the completion of the operation of workflow selector 245. Upon completion, action items file 265 is stored, for example in data stores 130, where it can be accessed by other construction document management modules 125. In one embodiment, an import action additionally toggles access to action items file 265 to allow other construction document management modules 125 to read and modify the content of action items file 265. Thus, the passed candidate action items are converted to a format that can be used directly by, for example, a submittal exchange service performed by other construction document management modules 125 of construction document management cloud system 105. Or, the passed candidate action items are converted and stored for later retrieval in a format that can be used directly by such a submittal exchange service.

In one embodiment, the action items file 265 is in an import format specific to construction document management cloud system 105. For example, action items file 265 is in a construction document management cloud system import format such as a Primavera® Submittal Exchange Cloud Service import format. In one embodiment, other construction document management modules 125 of the construction document management cloud system 105, such as a submittal exchange cloud service are pre-populated with the items of action items file 265. For example, project manual file 205 may be submitted in association with a particular project, and the action items of action items file 265 will be placed in default workflows associated with that project.

Thus, while the text of the construction project manual in project manual file 205 is written in natural language, the computing systems described herein write each extracted candidate action item in a standardized format—the action items of action items file 265—including a section number, section title, and expected item field to a network-based non-transitory storage device, such as data store 130.

Example User Interface

Figure 3:
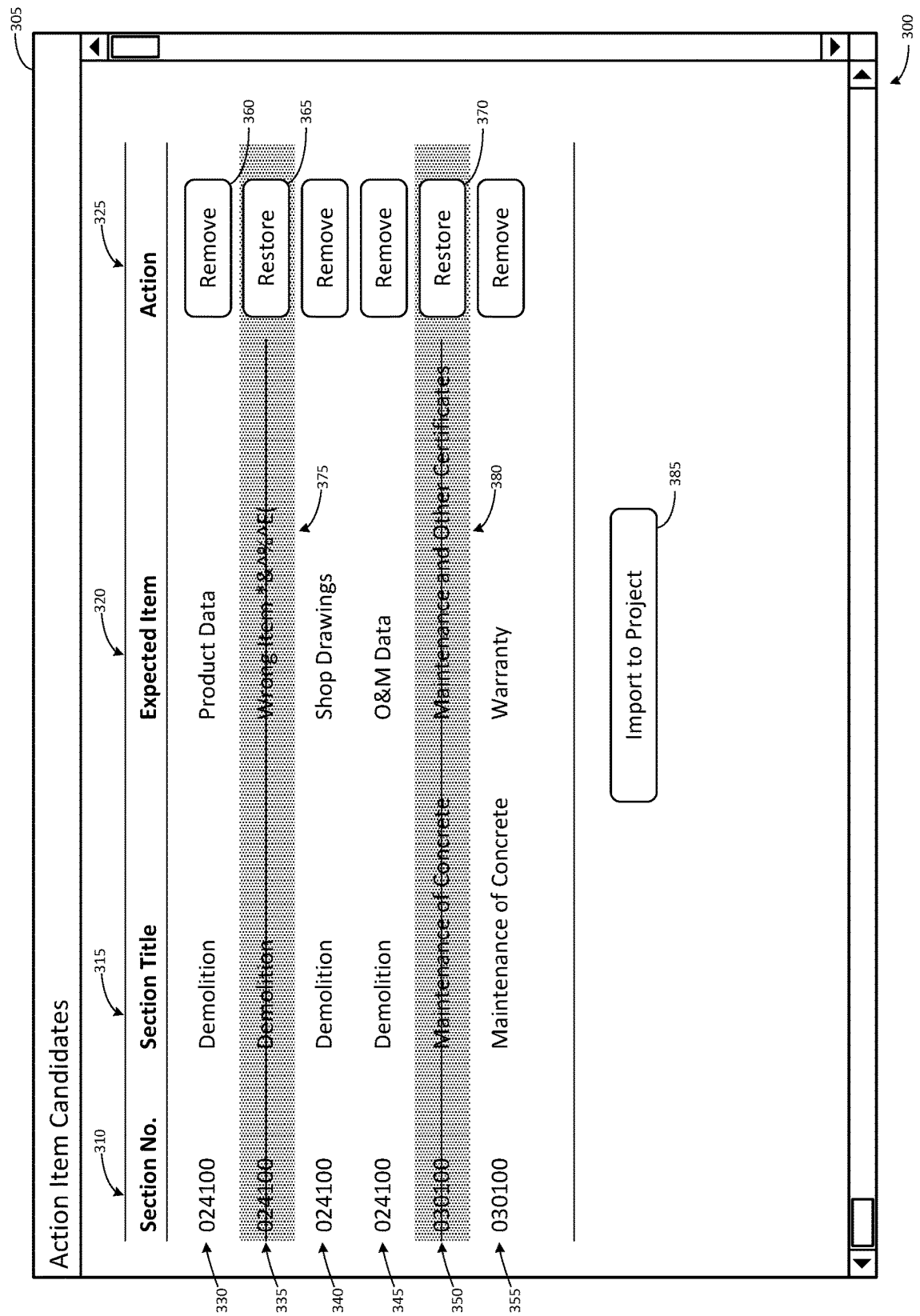
FIG. 3 illustrates an example candidate action item review graphical user interface associated with reviewing action item candidates in one embodiment of automatic smart extraction and workflow assignment of action items from construction project manuals.

FIG. 3 illustrates an example candidate action item review graphical user interface 300 associated with reviewing action item candidates in one embodiment of automatic smart extraction and workflow assignment of action items from construction project manuals.

For example, the candidate action item review GUI 300 may include a form (such as an HTML form) 305 to accept user input to change the status of whether candidate action items presented in the form are correctly identified as true action items or not. Form 305 of candidate action item review GUI 300 is transmitted by web interface server 135 to computer 145 (or 155) through network(s) 110 in response to completed operation of smart filter and selector 215 on a project manual and/or a request received from computer 145 (or 155). A user may operate the GUI 300 to correct incorrect identification of candidate action items as either of true action items (false positive) or not true action items (false negative).

In one embodiment, the candidate action items and their statuses are presented in form 305 in a "results grid" or tabular format, including a row for each candidate action item and including values under a section number column 310, a section title column 315, and an expected item column 320. A button for user input to change the status of the candidate action items is included for each row under action column 325. Example candidate action item rows 330-355 illustrate various information presented and actions available in form 305 regarding the candidate action items represented by the rows.

First candidate row 330 represents a candidate action item that has been determined by dynamic filter 225 to be a 'true' action item. First candidate row 330 is therefore presented with a plain background. This presentation visually indicates the dynamic filter's 'true' action item determination to the user. Third candidate row 340, fourth candidate row 345, and sixth candidate row 355 similarly represent action item candidates identified as 'true' action items by dynamic filter 225.

Form 305 may include a button that toggles the status of an associated action item between true action item and not true action item, for example a "remove"/"restore" button, such as remove button 360. User selection of remove button 360 indicates to the system that the user has contradicted or corrected the determination by the dynamic filter 225 that the action item candidate of first candidate row 330 is truly an action item. In other words, user selection of remove button 360 indicates to the system that the user considers the action item candidate of first candidate row 330 not to be a true action item. In response to selection of remove button 360, GUI 300 will change the status of the action item candidate of first candidate row 330 to "not a true action item" and redisplay the row in a struck-through, shaded manner including a restore button similar to that shown for second candidate row 335.

Second candidate row 335 and fifth candidate row 350 each represent an action item candidate that has been determined by dynamic filter 225 not to be a 'true' action item. Each of second candidate row 335 and fifth candidate row 350 are therefore presented with a strike-through with a shaded background and a restore button 365, 370. This presentation visually indicates the dynamic filter's "not a true action item" determination to the user.

The "remove"/"restore" button that switches the status of an action item can also switch the status from 'not a true action item' to 'true action item,' such as with restore buttons 365 and 370. User selection of restore button 365 indicates to the system that the user has contradicted or corrected the determination by the dynamic filter 225 that the action item candidate of second candidate row 335 is not truly an action item. Similarly, user selection of restore button 370 indicates to the system that the user is changing the determination that the action item candidate represented by the fifth candidate row 350 is not truly an action item. In other words, user selection of either restore button 365, 370 indicates to the system that the user considers the action item candidate of the row that includes the restore button to be a true action item. In response to selection of either remove button 365, 370 GUI 300 will change the status of the action item candidate of the associated candidate row to "a true action item" and redisplay the row without strikethrough or shading, and with a remove button in a manner similar to first candidate row 330.

Upon reviewing second candidate row 335, the user may decide that dynamic filter 225 correctly determined that the candidate action item of row 335 is not a true action item because of the clearly incorrect expected item value 375. The user will therefore not choose to select restore button 365, and will therefore accept the determination. Upon reviewing fifth candidate row 350, the user may decide that dynamic filter 225 has incorrectly determined that the candidate action item of row 350 is not a true action item because of the apparently correct expected item value 380. The user may therefore choose to select restore button 370, and will therefore correct the determination. This correction—indicating that the candidate action item of row 350 is indeed a true action item—may be fed back to train filter learning model 230. This correction will expand the definition of what constitutes a true action item in filter learning model 230, and will improve the accuracy of future operation of dynamic filter 225.

Note that the alternative visual indications of true/not true status of the candidate action item may be implemented beyond shaded/not shaded and not struck-through/struck-through. For example, different color text, fonts, font weights, bolding, italicization, highlighting, images, icons, or other visual indicators may be used to indicate the true/not true status of each candidate action item.

Form 305 may also include a "commit" or "import to project" button that indicates user approval of the true/not true status labels applied to the candidate action items, such as import to project button 385. In one embodiment, user selection of import to project button 385 initiates execution of a post method to transmit the currently selected status labels through network 110 to web interface server 135. In one embodiment, user corrections to the statuses of candidate action items do not take effect in construction document management cloud system 105 until import to project button 385 is selected.

Figure 4:
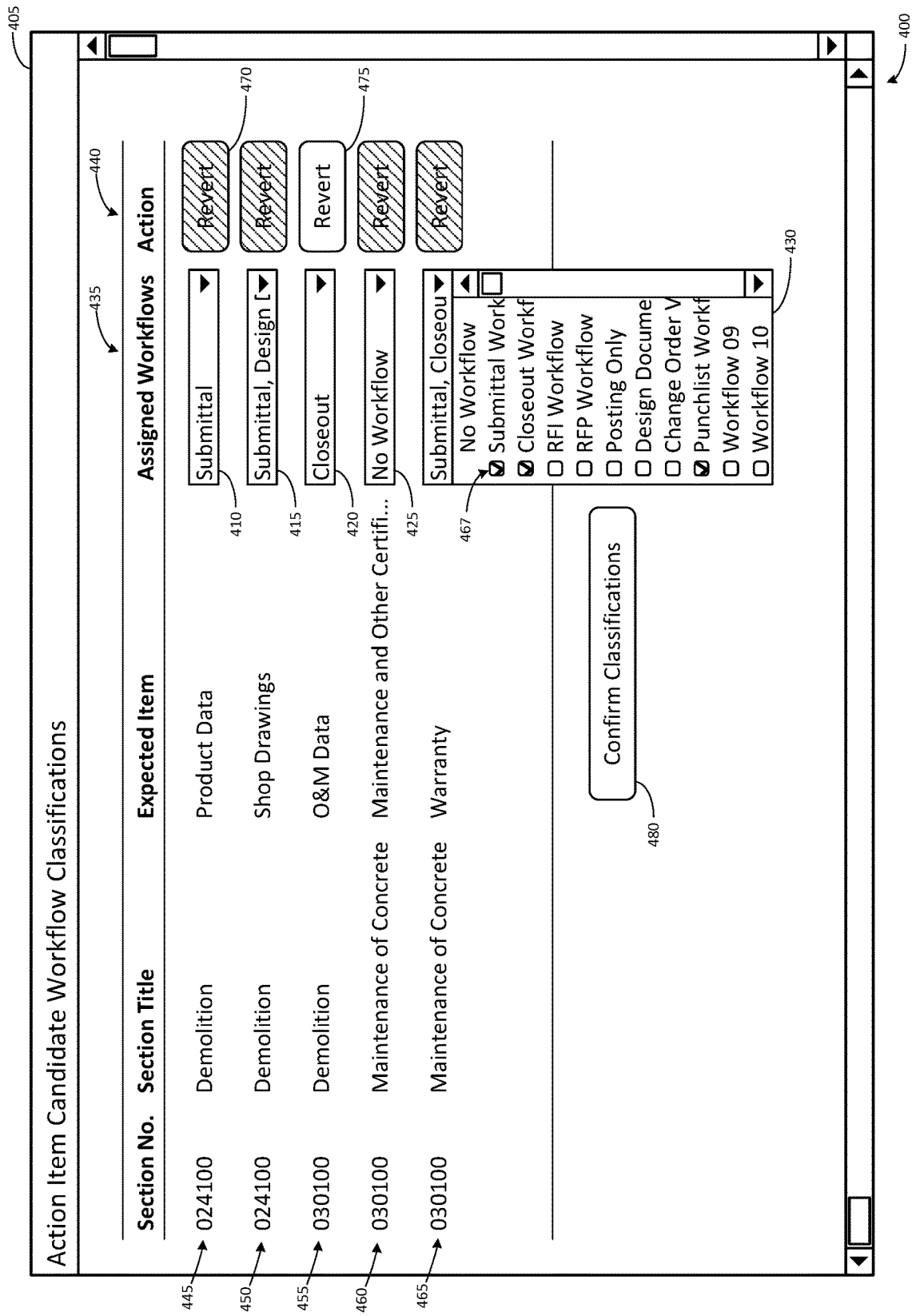
FIG. 4 illustrates an example classification review graphical user interface associated with reviewing workflow classifications assigned to action items in one embodiment of automatic smart extraction and workflow assignment of action items from construction project manuals.

FIG. 4 illustrates an example classification review graphical user interface associated with reviewing workflow classifications assigned to action items (assignment of action items into workflow classes) in one embodiment of automatic smart extraction and workflow assignment of action items from construction project manuals.

For example, the classification review GUI 400 may include a form (such as an HTML form) 405 to accept user input to change to the workflows that the candidate action items are assigned to by workflow selector 245. Form 405 of classification review GUI 400 is transmitted by web interface server 135 to computer 145 (or 155) through network(s) 110 in response to completed operation of smart filter and selector 215 on a project manual, in response to selection of import to project button 385, and/or a request received from computer 145 (or 155). A user may operate the GUI 400 to correct assignment of candidate action items to incorrect workflows, and change the assigned workflow of a candidate action item to a different workflow.

In one embodiment, the candidate action items and their workflow classifications are presented in form 405 in a "results grid" or tabular format similar to that of form 305, including a row for each candidate action item. The rows include values for the section number, section title, and expected value columns, and additionally include assigned workflow dropdown menus 410-430 in an assigned workflows column 435. A button for user input to switch the assigned workflow of the candidate action items back to the workflow assigned by workflow selector 245 is included for each row under action column 440. Example candidate action item rows 445-465 illustrate various information presented and actions available in form 405 regarding the candidate action items represented by the rows. The candidate rows 445—465 represent action items confirmed to be true action items following user operation of form 305. There are no candidate rows representing action item candidates confirmed not to be true action items, and so the candidate action item represented by candidate row 335 in form 305 is removed and not presented in form 405.

First candidate row 445 of form 405 corresponds to first candidate row 330 of form 305 and represents a candidate action item that has been assigned by workflow selector 245 to a submittal workflow, as shown in dropdown menu 410. A user may change this assignment using dropdown menu 410, which includes a list of one or more available workflows to which the candidate action item may be assigned. In one embodiment, each dropdown menu 410—430 includes the same list of workflows available for user selection. In one embodiment, the list of available workflows includes all preconfigured or default workflows for a project administered by (or configured in) construction document management cloud system 105. In one embodiment, the list of available workflows includes custom-configured workflows for the project.

Both the workflow selector 245 and the user can assign multiple workflows to a candidate action item. This may be represented by showing all the assigned workflows in the closed dropdown menu, for example as a comma-separated list. If space in the closed dropdown menu is limited, only an initial portion of the list is displayed in the menu. For example, second candidate row 450 of form 405 corresponds to third candidate row 340 of form 305 and represents a candidate action item that has been assigned by workflow selector 245 to two workflows: a Submittal workflow, and a Design Documents workflow, as shown in dropdown menu 415. In another embodiment, instead of a collapsible/expandable dropdown menu, the menu is an HTML "select"-style menu allowing multiple selections created by enabling the "multiple" attribute in the "select" tag, and including each of the workflow classes as an option within the menu.

One example dropdown menu 430 in fifth candidate row 465 is shown expanded in response to user selection of the dropdown menu 430. Using the dropdown menu 430, the user may highlight and select one or more workflows for the candidate action item represented by fifth candidate row 465. In one embodiment, the currently assigned workflows are shown with a checked box, such as checked box 467, highlighting, or other visual differentiation within the dropdown menu 430.

In one embodiment, both the workflow selector 245 and the user can indicate that a candidate action item is not to be assigned to any workflow. For example, fourth candidate row 460 of form 405 corresponds to fifth candidate row 350 of form 305 and represents a candidate action item that workflow selector 245 has determined should not be assigned to any workflow, as shown by the selection of "No Workflow" in dropdown menu 425. The user can also indicate that no workflow should be assigned to a candidate action item by selecting the "No Workflow" option from the menu. In one embodiment, user selection of the "No Workflow" option in the menu for a candidate action item will remove all workflows currently assigned to the candidate action item, and un-check all the boxes in the menu.

In dropdown menu 430, two example custom-configured workflows are selectable by selecting the "Workflow 09" and "Workflow 10" menu options. Note that the custom-configured workflows may have more descriptive names than the simple numbers used herein for simplicity.

User selection of a 'revert' button, such as revert buttons 470 or 475, causes the selected workflows in the dropdown menu in the same row to be changed back to the workflows (if any) originally selected by workflow selector 245 for the candidate action item represented by that row. In first candidate row 445, revert button 470 is shown grayed-out because the user has not changed the workflow selection away from the assignment of the Submittal workflow by workflow selector 245, and the revert action is therefore unnecessary and unavailable for first candidate row 445. In third candidate row 455, workflow selector 245 initially assigned the candidate action item represented by row 455 to a different workflow, for example, the Submittal workflow. As shown in dropdown menu 420, a user has changed the selected workflow to the Closeout workflow. Revert button 475 in third candidate row 455 is shown as active (as indicated by lack of gray-out). The revert action becomes available because a user has changed the workflow selection away from the initial assignment by workflow selector 245.

User selection of the revert button 475 will cause the selected workflow of row 455 to be changed back to the workflow initially assigned by workflow selector 245, in this case the Submittal workflow.

Form 405 may also include a 'confirm classifications' that indicates user approval of the selected workflow classifications of all candidate action items, such as confirm classifications button 480. In one embodiment, user selection of confirm classifications button 480 initiates execution of a post method to transmit the currently classifications through network 110 to web interface server 135. In one embodiment, the selected workflow classifications are written to the appropriate fields in the candidate action item objects in response to user selection of confirm classifications button 480.

In one embodiment, the assigned workflow column of assigned workflow dropdown menus 410—430 may be inserted into form 305, and the functionality described with reference to form 405 may be merged with the functionality of form 305.

Example Method for Extraction and Workflow Assignment

In one embodiment, each step of computer-implemented methods described herein may be performed by a processor (such as processor 1010 as shown and described with reference to FIG. 10) of one or more computing devices (i) accessing memory (such as memory 1015 and/or other computing device components shown and described with reference to FIG. 10) and (ii) configured with logic to cause the system to execute the step of the method (such as smart extraction and workflow assignment logic 1030 shown and described with reference to FIG. 10). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1015, or storage/disks 1035 of computing device 1005 or remote computers 1065 shown and described with reference to FIG. 10).

In one embodiment, each subsequent step of a method commences in response to parsing a signal received or stored data retrieved indicating that the previous step has been performed at least to the extent necessary for the subsequent step to commence. Generally, the signal received, or the stored data retrieved indicates completion of the previous step.

Figure 5:
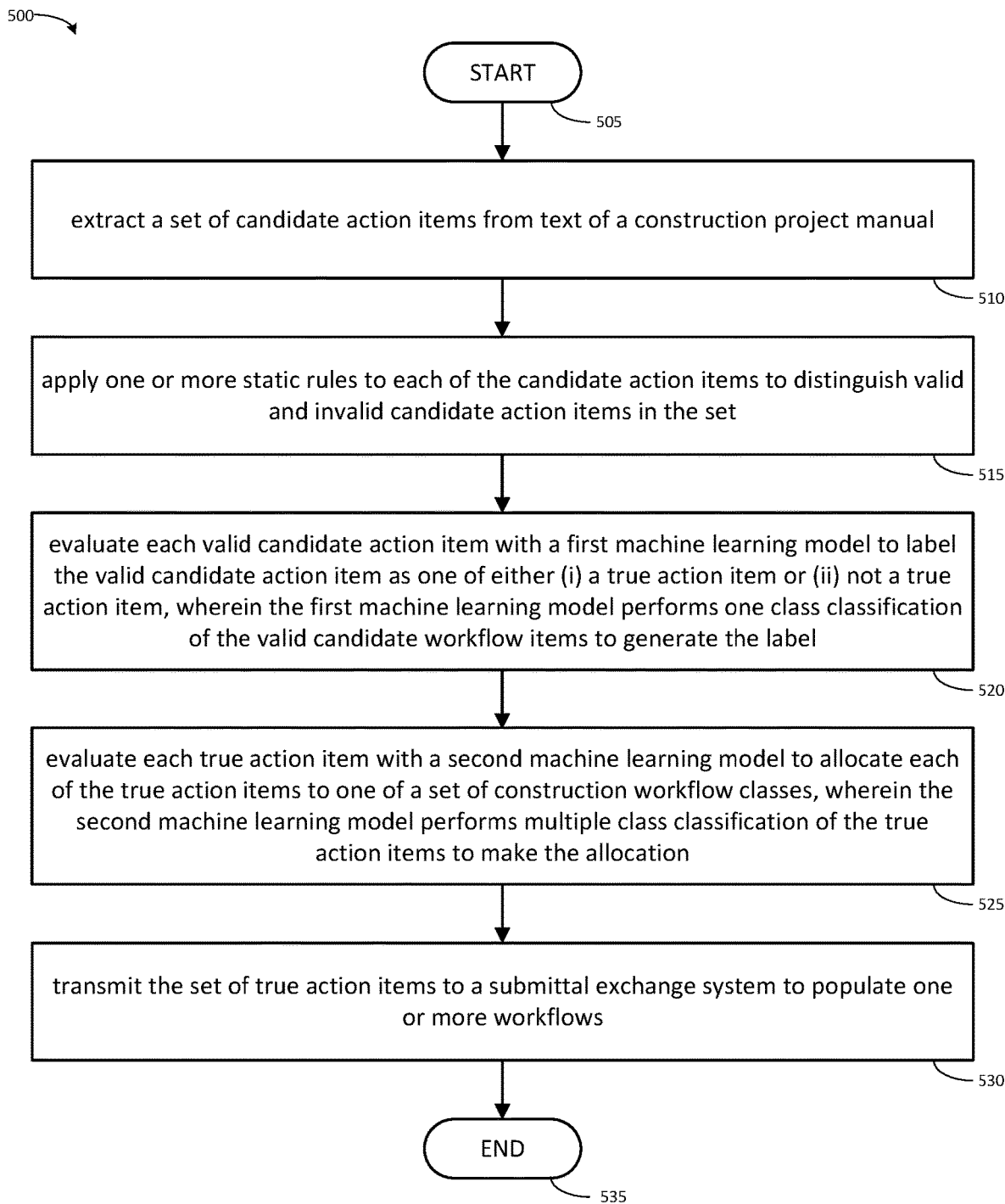
FIG. 5 illustrates one embodiment of a method associated with automatic smart extraction and workflow assignment of action items from construction project manuals.

FIG. 5 illustrates one embodiment of a method 500 associated with automatic smart extraction and workflow assignment of action items from construction project manuals. In one embodiment, the method 500 extracts construction project action items and the type of submittal document or other information expected to fulfill that action item from a construction project manual, such as project manual 205. The method 500 generates an output file, such as action items file 250, containing the extracted action items, validated and filtered to remove items that are not actual action items, and categorized as to the type of submittal document or other information that is to be provided.

In one embodiment, the steps of method 500 are performed by smart extraction and workflow assignment module 120, web interface server 135, and data stores 130 in co-operation (as shown and described with reference to FIG. 1). In one embodiment, these components are one or more special purpose computing device (such as computing device 1005) configured with smart extraction and workflow assignment logic 1030. In one embodiment, smart extraction and workflow assignment module 120 is a module of a special purpose computing device configured with logic 1030.

The method 500 may be initiated based on various triggers, such as receiving a signal over a network or parsing stored data indicating that (i) a user (or administrator) of construction document management cloud system 105 has initiated method 500, (ii) method 500 is scheduled to be initiated at defined times or time intervals, or (iii) a user or administrator has uploaded or selected a construction project manual (such as project manual 205 for smart extraction and workflow assignment of action items included in the construction manual text. The method 500 initiates at START block 505 in response to parsing a signal received or stored data retrieved and determining that the signal or stored data indicates that the method 500 should begin. Processing continues to process block 510.

At process block 510, the processor extracts a set of candidate action items from text of a construction project manual.

In one embodiment, the processor executes functions of basic extractor 210 to extract the set of candidate action items from the text of a construction project manual, as shown and described in further detail with reference to FIG. 2. In one embodiment, the processor operates a computing system to extract the set of candidate action items from the text of a construction project manual as follows. The processor retrieves a construction project manual file from storage. The processor parses the project manual file to identify machine-encoded text and images of print text in the project manual file. If the file contains a body of machine-encoded text strings, the processor gathers those text strings from the file and writes them in print document order into an output text document. If the file contains images of print text, the processor executes an OCR process on the images and writes the recognized text as text strings to the output text document in print order. The processor retrieves a set of pattern matching rules—rules which identify likely action items—from storage. The processor parses the output text document with the pattern matching rules to identify portions of the output text document that satisfy one or more of the pattern matching rules and are therefore likely action items. The processor identifies a section number, section title, and expected item for each likely action item. The processor creates a candidate action item data structure for each likely action item, the data structure including the section number, section title, and expected action item values for the likely action item. The processor populates a project action items table or list data structure for the project described by the construction project manual with the candidate action item data structures for all likely action items. The processor stores the project action items table.

Once the processor has thus completed extracting a set of candidate action items from text of a construction project manual, processing at process block 510 completes, and processing continues to process block 515.

At process block 515, the processor applies one or more static rules to each of the candidate action items to distinguish valid and invalid candidate action items in the set.

In one embodiment, the processor executes functions of validator 220 to apply static rules to each candidate action item to distinguish valid and invalid candidate action items, as shown and described in further detail with reference to FIG. 2. In one embodiment, the processor operates a computing system to distinguish valid candidate action items from invalid candidate action items represented by the candidate action item data structures as follows. The processor retrieves the populated project action items data structure from storage. The processor also retrieves the set of static rules from storage. The processor further retrieves a set of known information about the expected structure of the construction project manual. In one embodiment, the set of static rules describe ways in which a candidate action item object is to be consistent with the known information. For each candidate action item data structure in the project action items data structure, the processor performs the operations described by the set of static rules on the candidate action item data structure to determine if there is any inconsistency between the candidate action item described by the candidate action item data structure and the known information. If there is an inconsistency found for a candidate action item data structure, the processor removes the inconsistent candidate action item data structure from the project action items table data structure. If no inconsistency is found for a candidate action item data structure, no action is taken, and the consistent candidate action item data structure is left to remain in the project action items table data structure. In one embodiment, other static processing functions are also performed on the candidate action item data structures in the project action items table data structure. Following application of the static rules to all candidate action item data structures in the project action items table data structures, the updated project action items table data structure is stored.

Once the processor has thus completed applying one or more static rules to each of the candidate action items to distinguish valid and invalid candidate action items in the set, processing at process block 515 completes, and processing continues to process block 520.

At process block 520, the processor evaluates each valid candidate action item with a first machine learning model to label the valid candidate action item as one of either (i) a true action item or (ii) not a true action item. Here, the first machine learning model performs one-class classification of the valid candidate action items to generate the label.

In one embodiment, the processor executes functions of dynamic filter 225 and filter learning model 230 to label each candidate action item as either a true action item or not a true action item, as shown and described in further detail with reference to FIG. 2. In one embodiment, the processor operates a computing system to perform one class classification of each candidate action item data structure in the updated project action items table data structure as either belonging to the set of true action items or not as follows. The processor retrieves the project action items data structure (as updated in process block 515) from storage. The processor also accesses a machine learning model that has been trained to classify candidate action item data structures as belonging to the set of true action items using a one-class (or unary) classification algorithm. In one embodiment, the machine learning model has been trained using a training set containing only action item data structures that represent true action items. In one embodiment, the machine learning model has been trained using a training set containing only action item data structures labeled as representing true action items, and action item data structures that are unlabeled as to whether they represent true action items or not. For each candidate action item data structure in the project action items data structure, the processor analyzes the candidate action item data structure using the trained machine learning model to predict whether the action item data structure represents a true workflow. If analysis with the model predicts that the action item data structure represents a true action item, the processor writes a label indicating a true action item to a label field in the action item data structure. If analysis with the model predicts that the action item data structure does not represent a true action item, the processor writes a label indicating not a true action item to the label field in the action item data structure. Following application of labels to all candidate action item data structures in the project action items table data structures, the labeled project action items table data structure is stored.

Once the processor has thus completed evaluating each valid candidate action item with a first machine learning model to label the valid candidate action item as one of either (i) a true action item or (ii) not a true action item, processing at process block 520 completes, and processing continues to process block 525.

At process block 525, the processor evaluates each true action item with a second machine learning model to allocate each of the true action items to one of a set of construction workflow classes. Here, the second machine learning model performs multiple class classification of the true action items to make the allocation.

In one embodiment, the processor executes functions of workflow selector 245 and assignment learning model 250 to assign each candidate action item to a construction workflow class, as shown and described in further detail with reference to FIG. 2. In one embodiment, the processor operates a computing system to perform multiple class classification of each candidate action item data structure in the labeled project action items table data structure as belonging to one or more of a set of pre-configured construction workflow classes as follows. The processor retrieves the project action items data structure (as labeled in process block 520) from storage. The processor also accesses a machine learning model that has been trained to classify candidate action item data structures as belonging to one of a set of pre-configured construction workflow classes using a multi-class classification algorithm. In one embodiment, the machine learning model has been trained with a training set containing action item data structures correctly classified into each one of the set of construction workflow classes. For each candidate action item data structure in the project action items data structure, the processor analyzes the candidate action item data structure using the trained machine learning model to predict to which ones of the construction workflow classes the candidate action item represented by the data structure belongs. The processor writes the predicted class(es) to a workflow class data field in the candidate action item data structure. This categorizes the candidate action item data structure by workflow class. Note that, in one embodiment, the "No Workflow" class is assigned to the candidate action item data structure as a default only where the trained machine learning model fails to identify any construction workflow class for the candidate action item data structure. Following the classification (or assignment or assignment) of all candidate action item data structures in the data project action items data structure, the classified project action items data structure is stored.

Once the processor has thus completed evaluating each true action item with a second machine learning model to allocate each of the true action items to one of a set of construction workflow classes, processing at process block 525 completes, and processing continues to process block 530.

At process block 530, the processor transmits the set of true action items to a submittal exchange system to populate one or more workflows.

In one embodiment, the processor executes functions to create an action items file, as shown and described in further detail with reference to FIG. 2. In one embodiment, the processor operates a computing system to transmit the set of true action items to a submittal exchange system to populate one or more workflows as follows. The processor retrieves the project action items data structure (as classified by process block 525) from storage. For each candidate action item object in the project action items data structure, the processor creates a final action item data structure including the values of the section number, section title, expected item, and workflow class data fields of the candidate action item object. In one embodiment, the final action item data structure follows the format expected by and compatible for use in (or for import into) a submittals exchange module of a construction document management cloud system. The processor writes each final action item data structure into an action items file. Following the addition of each final action item data structure to the action items file, the processor stores the action items file. In one embodiment, the processor generates a message indicating that an action items file for the construction project has been created, including a reference to the location of the action items file in storage. The processor transmits the message to a submittals exchange module of a construction document management cloud system, so that the submittals exchange module can import the action items file. In one embodiment, the processor transmits the action items file to a submittals exchange module of a construction document management cloud system for import by the submittals exchange module. The transmission is accompanied by a message indicating that the transmitted action items file is for the construction project.

Once the processor has thus completed transmitting the set of true action items to a submittal exchange system to populate one or more workflows, processing at process block 530 completes, and processing continues to END block 535, where process 500 ends.

Example Methods for Ongoing ML Model Training

Figure 6:
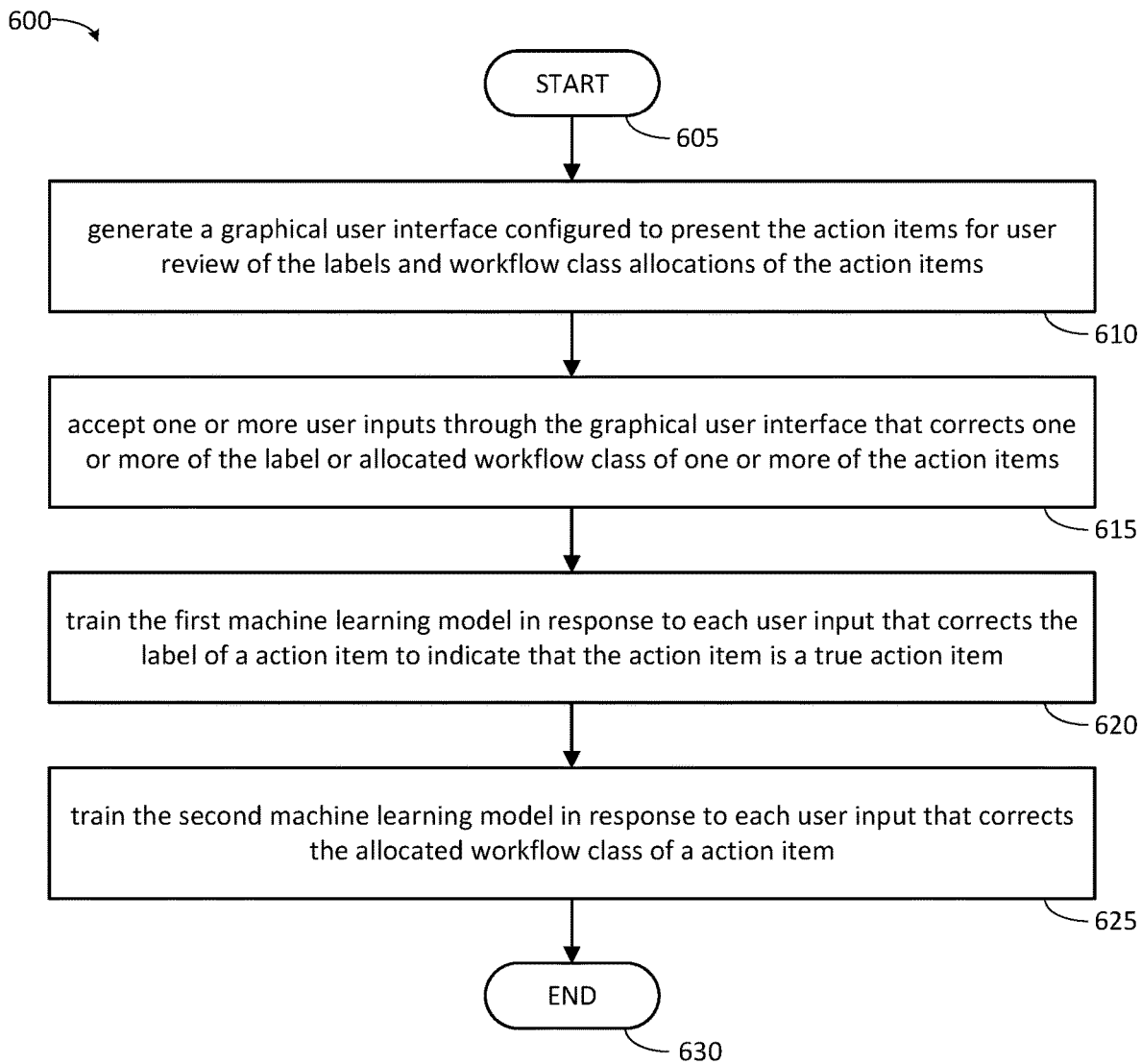
FIG. 6 illustrates one embodiment of a method for training machine learning models in response to user corrections to outputs associated with one embodiment of automatic smart extraction and workflow assignment of action items from construction project manuals.

FIG. 6 illustrates one embodiment of a method 600 for training machine learning models in response to user corrections to outputs associated with one embodiment of automatic smart extraction and workflow assignment of action items from construction project manuals. In one embodiment, the steps of method 600 are performed by smart extraction and workflow assignment module 120, web interface server 135, and data stores 130 in co-operation (as shown and described with reference to FIG. 1).

The method 600 may be initiated based on various triggers, such as receiving a signal over a network or parsing stored data indicating that (i) a user (or administrator) of construction document management cloud system 105 has initiated method 600, (ii) method 600 is scheduled to be initiated at defined times or time intervals, (iii) construction document management cloud system 105 has completed generating a set of one or more action item candidates from a project manual 205; (iv) a set of one or more action item candidates from a project manual 205 is ready for user review; or (v) a user (or administrator) of construction document management cloud system 105 has requested a review of a set of one or more action item candidates. The method 600 initiates at START block 605 in response to parsing a signal received or stored data retrieved and determining that the signal or stored data indicates that the method 600 should begin. Processing continues to process block 610.

At process block 610, the processor generates a graphical user interface configured to present the action items for user review of the labels and workflow class allocations of the action items.

In one embodiment, the processor generates the graphical user interface to present each action item labeled as a true action item in a row that includes a selectable button which when selected changes the label of the action item of the row to indicate that the action item is not a true action item, as shown and described with reference to FIG. 3. For example, the processor the processor retrieves a template "results grid" form from storage. The processor retrieves the candidate action item data structures from the project action items table data structure, and configures the template results grid form to display the section number, section title, and expected item values from each candidate action item data structure in a row for the candidate action item. Also, the processor generates the graphical user interface to present each action item labeled as not a true action item in a row (i) where text in the row is struck through or the background is shaded to indicate that the workflow is not a true action item, and (ii) that includes a selectable button which when selected changes the label of the action item of that row to indicate that the action item is a true action item, as shown and described with reference to FIG. 3. For example, the processor accesses the label field of the candidate action item data structure. If the value of the label field indicates that the candidate action item is not a true action item, the processor further configures the template results grid to show the row that represents the candidate action item data structure (i) on a shaded background; (ii) with struck-through text; and (iii) with a "restore" button. If the value of the label field indicates that the candidate action item is a true action item, the processor further configures the template results grid to show the row that represents the candidate action item data structure (i) on a plain, non-shaded background; (ii) with ordinary, non-struck-through text; and (iii) with a "remove" button. These various display features may be applied using cascading style sheet (CSS) styles, or appropriate HTML tags.

In one embodiment, the processor generates the graphical user interface to present a selectable menu for a section title field in at least one row, which when a different menu option is selected changes the allocated construction workflow class of the action item of that row, as shown and described with reference to FIG. 4. For example, the processor retrieves a template "results grid" form from storage. The processor retrieves the candidate action item data structures from the project action items table data structure, and configures the template results grid form to display the section number, section title, and expected item values from each candidate action item data structure in a row for the candidate action item. Also, the processor generates the graphical user interface to present a selectable menu, such as a dropdown menu or multiple selection list menu, for an assigned workflow field in each row. The selectable menu includes entries for each workflow class to which an action item may be assigned. The processor accesses a workflow class field in the candidate action item data structure and displays the value in the field as the initial selected value in the selectable menu. The selectable menu is configured to, upon selection of a new value, change the workflow class assigned to the action item of that row, as shown and described with reference to FIG. 4.

Once the processor has thus completed generating a graphical user interface configured to present the action items for user review of the labels and workflow class allocations of the action items, processing at process block 610 completes, and processing continues to process block 615.

At process block 615, the processor accepts one or more user inputs through the graphical user interface that corrects one or more of the label or allocated workflow class of one or more of the action items.

In one embodiment, as described in further detail with reference to FIGS. 3 and 4, the processor transmits the graphical user interface over a network to an other computer in an enterprise network of an enterprise associated with the project for display to a user. In one embodiment, in an action item candidates review GUI such as that shown in FIG. 3, the user may select a remove/restore button in one or more rows representing a candidate action item in order to change the true action item/not true action item status of the candidate action item, and select a button to finalize or approve the changes, such as import to project button 385. In response to the finalization of the changes, the other computer executes a post action to return the user-approved configuration of true action item/not true action item statuses to the processor. The processor updates the label field values of those candidate action item data structures corresponding to the user-input changes to reflect the user-input changes.

In one embodiment, in an action item candidate classification review GUI such as that shown in FIG. 4, the user may select a different workflow class from the initial selected value in order to change the workflow class assigned to the candidate action item, and select a button to finalize or approve the changes, such as confirm classifications button 480. In response to the finalization of the changes, the other computer executes a post action to return the user-approved configuration of workflow classifications to the processor. The processor updates the workflow class field values of those candidate action item data structures corresponding to the user-input changes to reflect the user-input changes.

Once the processor has thus completed accepting one or more user inputs through the graphical user interface that corrects one or more of the label or allocated workflow class of one or more of the action items, processing at process block 615 completes, and processing continues to process block 620.

At process block 620, the processor trains the first machine learning model in response to each user input that corrects the label of an action item to indicate that the action item is a true action item.

In one embodiment, the processor copies each candidate action item data structure with a label updated from indicating "not a true action item" (as assigned by the dynamic filter) to indicate "a true action item" to a filter learning training set file. The processor operates the filter learning model (such as model 230) to further train the model using each candidate action item data structure in the filter learning training set file. The candidate action item data structures of the filter learning training set file may be stored by the processor in a learning list of the filter learning model for future reference by the model. Upon completion of the further training of the filter learning model, the filter learning training set file may be discarded.

In one embodiment, the processor also copies each candidate action item data structure with a label updated from indicating 'a true action item' (as assigned by the dynamic filter) to 'not a true action item' to the filter learning training set file. These candidate action item data structures are also used in further training the filter learning training model and may be stored in the learning list of the filter learning model.

Once the processor has thus completed training the first machine learning model in response to each user input that corrects the label of an action item to indicate that the action item is a true action item, processing at process block 620 completes, and processing continues to process block 625.

At process block 625, the processor trains the second machine learning model in response to each user input that corrects the allocated workflow class of an action item.

In one embodiment, the processor copies each candidate action item data structure with a workflow class value updated from the initial workflow classification assigned by the workflow selector to a different value to a workflow selector training set file. The processor operates the assignment learning model (such as model 250) to further train the model using each candidate action item data structure in the assignment learning training set file. The candidate action item data structures of the assignment learning training set file may be stored by the processor in a learning list of the assignment learning model for future reference by the model. Upon completion of the further training of the assignment learning model, the assignment learning training set file may be discarded.

Once the processor has thus completed training the second machine learning model in response to each user input that corrects the allocated workflow class of an action item, processing at process block 625 completes, and processing continues to END block 630, where process 600 ends.

In one embodiment, where the user inputs correct only labels of action items, process block 620 is performed and upon completion, processing continues directly to END block 630, and process block 625 is not performed. In one embodiment, where the user inputs correct only allocated workflow classes of action items, processing continues directly to perform process block 625, and process block 620 is not performed. In one embodiment, where the user inputs correct both labels of action items, process block 625 may also alternatively be performed prior to process block 620, or be performed in parallel with process block 620.

Repetition of this training of the two machine learning models for multiple projects for a single tenant or even across multiple tenants of the system continuously improves the accuracy of the dynamic filter 225 and workflow selector 245. In one embodiment, the accuracy of the dynamic filter 225 may increase to the extent (for example, 90% accuracy or greater) that it may make validator 220 irrelevant, and dynamic filter 225 may take validator 220's place as the initial processing of smart filter and selector 215.

Figure 7:
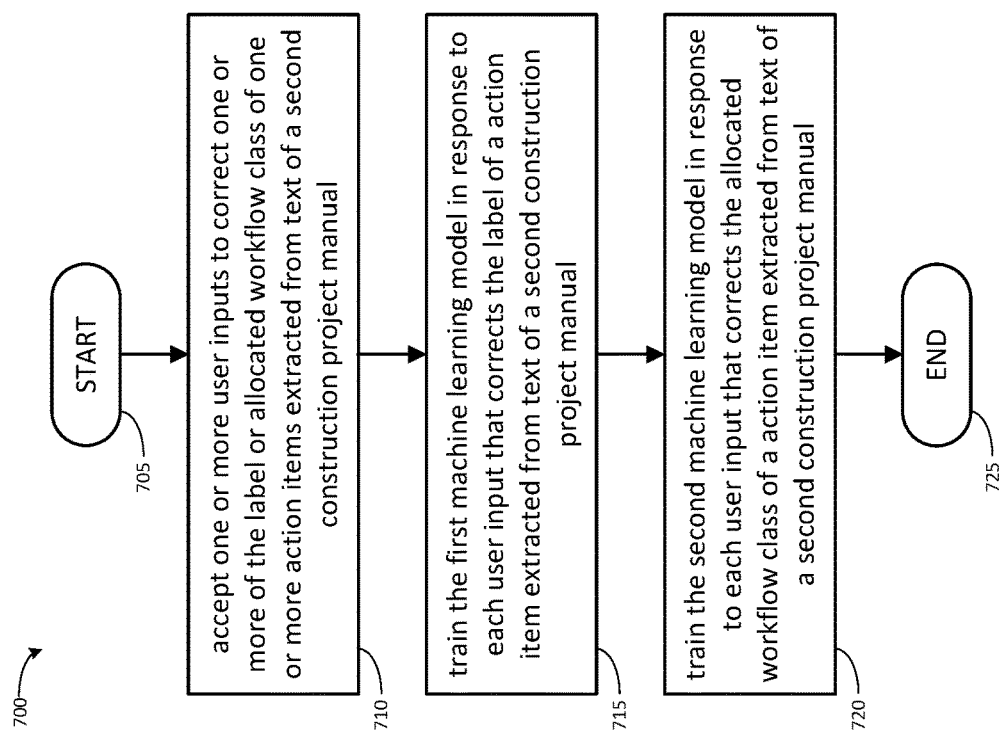
FIG. 7 illustrates another embodiment of a method for training machine learning models in response to user corrections to outputs associated with one embodiment of automatic smart extraction and workflow assignment of action items from construction project manuals.

FIG. 7 illustrates another embodiment of a method 700 for training machine learning models in response to user corrections to outputs associated with one embodiment of automatic smart extraction and workflow assignment of action items from construction project manuals. In one embodiment, the steps of method 700 are performed by smart extraction and workflow assignment module 120, web interface server 135, and data stores 130 in co-operation (as shown and described with reference to FIG. 1).

As mentioned above, the two models may be trained based on user feedback for multiple construction project manuals. The multiple construction project manuals and may be submitted by the same tenant of the construction document management cloud system, or by other tenants of the construction document management cloud system. The two machine learning models are shared among multiple tenants, and the training performed by one tenant improves the accuracy of the models for other tenants. In one embodiment, training updates to one instance of the machine learning models for one tenant are retained in master configuration files for the training models, and all subsequent instances of the machine learning models for the one tenant or other tenants also incorporate those training updates to refine the accuracy of the models. Method 700 illustrates one implementation of multi-project, single- or multi-tenant training.

The method 700 may be initiated based on various triggers, such as receiving a signal over a network or parsing stored data indicating that (i) a user (or administrator) of construction document management cloud system 105 has initiated method 700, (ii) method 700 is scheduled to be initiated at defined times or time intervals, (iii) construction document management cloud system 105 has completed generating a set of one or more action item candidates from an additional project manual; (iv) a set of one or more action item candidates from an additional project manual is ready for user review; or (v) a user (or administrator) of construction document management cloud system 105 has requested a review of a set of one or more action item candidates generated from an additional project manual. The method 700 initiates at START block 705 in response to parsing a signal received or stored data retrieved and determining that the signal or stored data indicates that the method 700 should begin. Processing continues to process block 710.

In one embodiment, prior to process block 710, the processor extracts a second set of action items from text of a second construction project manual in substantively the same manner as described for the first construction project manual in process blocks 505 through 525 of method 500. The processor then generates a user interface that presents the second set of action items extracted from the second construction project manual for user input in substantially the same manner as described for the first set of action items in process block 610 of method 600.

At process block 710, the processor accepts one or more user inputs to correct one or more of the label or allocated workflow class of one or more action items (the second set of action items) extracted from text of a second construction project manual in substantially the same manner as described for the first set of action items in process block 615 of method 600. In one embodiment, the user inputs come from a user associated with the same tenant that submitted the first construction project manual. In one embodiment the user inputs come from a user associated with a different tenant than the one that submitted the first construction project manual. Processing at process block 710 completes, and processing continues to process block 715.

At process block 715, the processor trains the first machine learning model in response to each user input that corrects the label of an action item extracted from text of the second construction project manual in substantially the same manner as described for user inputs that correct the label of an action item extracted from text of the first construction project manual in process block 620 of method 600. Processing at process block 715 completes, and processing continues to process block 720.

At process block 720, the processor trains the second machine learning model in response to each user input that corrects the allocated workflow class of an action item extracted from text of a second construction project manual in substantially the same manner as described for user inputs that correct the allocated workflow class of an action item extracted from text of the first construction project manual in process block 625 of method 600. Processing at process block 720 completes, and processing continues to END block 725, where process 700 ends.

In one embodiment, where the user inputs correct only labels of action items, process block 715 is performed and upon completion, processing continues directly to END block 725, and process block 720 is not performed. In one embodiment, where the user inputs correct only allocated workflow classes of action items, processing continues directly to perform process block 720, and process block 715 is not performed. In one embodiment, where the user inputs correct both labels of action items, process block 720 may also alternatively be performed prior to process block 715, or be performed in parallel with process block 715.

Example Methods for Initial Training of ML Models

Figure 8:
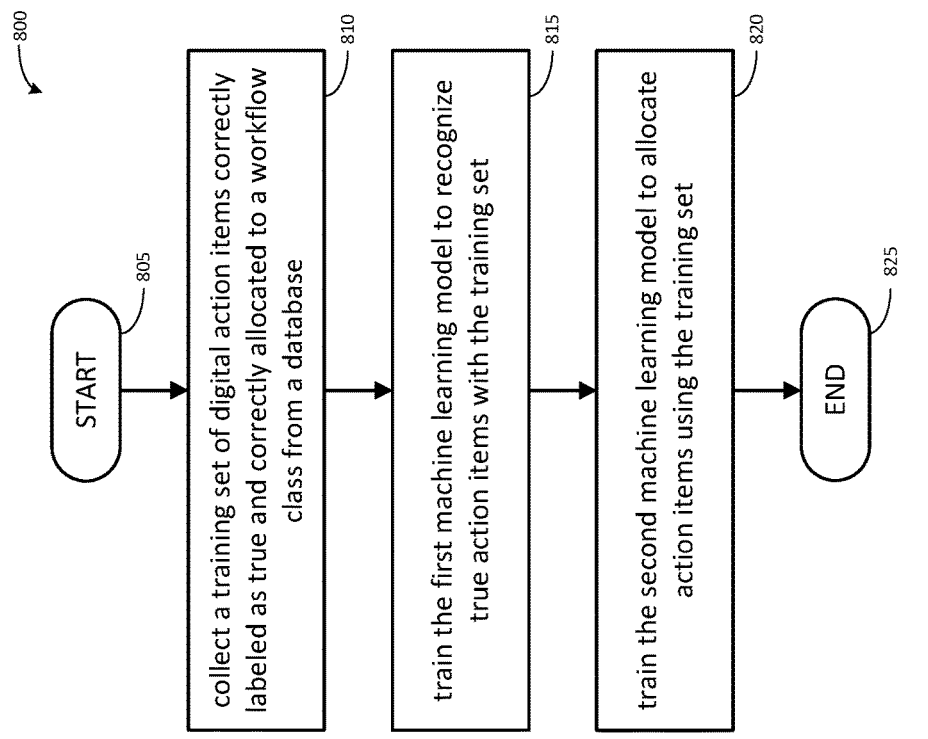
FIG. 8 illustrates one embodiment of a method for initial training of machine learning models associated with one embodiment of automatic smart extraction and workflow assignment of action items from construction project manuals.

In one embodiment, the filter learning model initially trained using only positive data—action items known to be 'true action items'—which have also been assigned a workflow class. One source for such data is historic action items already in use or previously used in construction document management cloud system 105. On this basis, FIG. 8 illustrates one embodiment of a method 800 for initial training of machine learning models associated with one embodiment of automatic smart extraction and workflow assignment of action items from construction project manuals. In one embodiment, the steps of method 800 are performed by smart extraction and workflow assignment module 120 and data stores 130 in co-operation (as shown and described with reference to FIG. 1).

The method 800 may be initiated based on various triggers, such as receiving a signal over a network or parsing stored data indicating that (i) a user (or administrator) of construction document management cloud system 105 has initiated method 800, (ii) that that method 800 is scheduled to be initiated at defined times or time intervals, or (iii) that a new installation of construction document management cloud system 105 is installed. The method 800 initiates at START block 805 in response to parsing a signal received or stored data retrieved and determining that the signal or stored data indicates that the method 800 should begin. Processing continues to process block 810.

At process block 810, the processor collects a training set of digital action items correctly labeled as true and correctly allocated to a workflow class from a database.

In one embodiment, the processor retrieves historical action item data structures that are either currently in use by, or previously used by a construction document management cloud system to manage the exchange of action item documents. For example, these historical action item data structures may be those that are already identified and assigned a workflow class either by humans or by a digital system. The processor determines a sample set, which may include all, or only some of the historical action item data structures available in the construction document management cloud system. Where the sample set is smaller than all available action items, the sample may be randomly selected by the processor. For each of the historical action item data structures in the sample set, the processor accesses and copies the values of the section number, the section title, the expected item, and workflow fields in the historical action item data structure to equivalent fields in a new training data structure. The training data structure also includes a label field with the label set to true, because the historical action item data structures are all known to be true action items. The training data structure has the same format as the candidate action item data structure. Each of the training data structures is added to a training data set structure in storage.

In one embodiment, the processor retrieves a pre-configured training set of digital action items correctly labeled as true and correctly allocated to a workflow class from storage. As above, the digital action items—represented by training data structures—are in the same format as the candidate action item data structure.

Once the processor has thus completed collecting a training set of digital action items correctly labeled as true and correctly allocated to a workflow class from a database, processing at process block 810 completes, and processing continues to process block 815.

At process block 815, the processor trains the first machine learning model to recognize true action items with the training set in substantially the same manner as the processor trains the first machine learning model with user inputs that correct the label of an action item extracted from text of the first construction project manual in process block 620 of method 600. Processing at process block 815 completes, and processing continues to process block 820.

At process block 820, the processor trains the second machine learning model to allocate action items using the training set in substantially the same manner as the processor trains the second machine learning model with user inputs that correct the allocated workflow class of an action item extracted from text of the first construction project manual in process block 625 of method 600. Processing at process block 820 completes, and processing continues to END block 825, where process 800 ends.

In one embodiment, where the user inputs correct both labels of action items, process block 820 may also alternatively be performed prior to process block 815, or be performed in parallel with process block 815.

Figure 9:
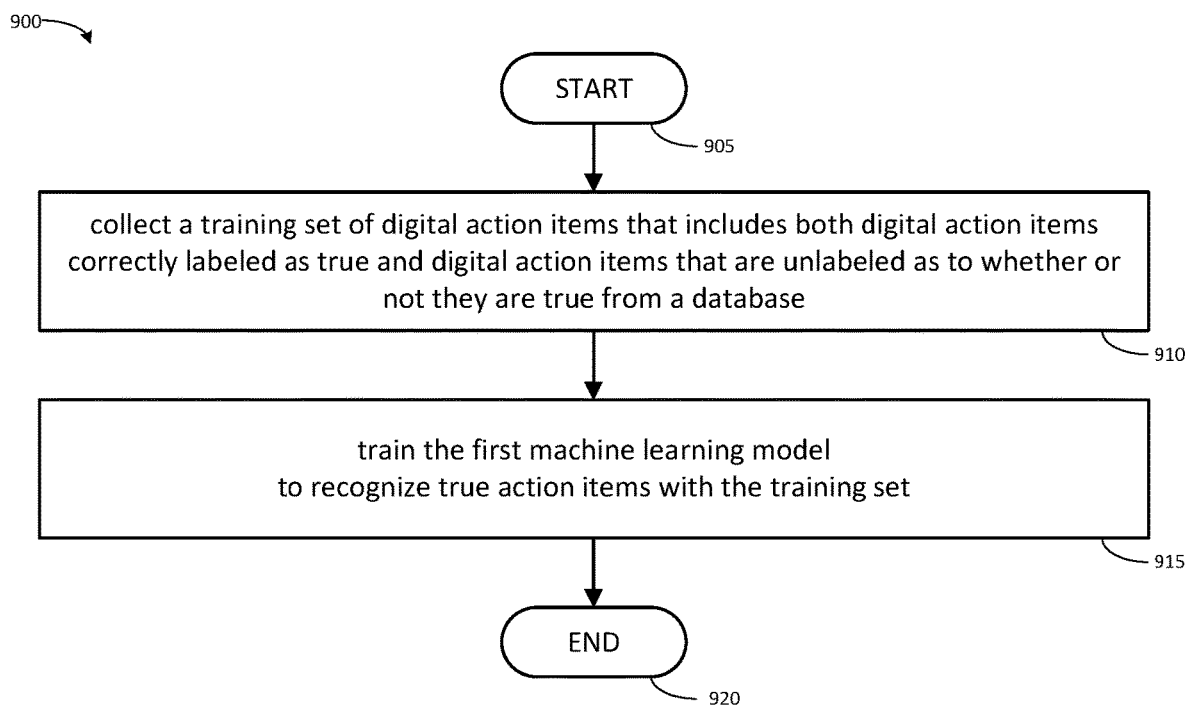
FIG. 9 illustrates another embodiment of a method for initial training of machine learning models associated with one embodiment of automatic smart extraction and workflow assignment of action items from construction project manuals.

FIG. 9 illustrates another embodiment of a method 900 for initial training of machine learning models associated with one embodiment of automatic smart extraction and workflow assignment of action items from construction project manuals. In one embodiment, the steps of method 900 are performed by smart extraction and workflow assignment module 120 and data stores 130 in co-operation (as shown and described with reference to FIG. 1).

The method 900 may be initiated based on various triggers, such as receiving a signal over a network or parsing stored data indicating that (i) a user (or administrator) of construction document management cloud system 105 has initiated method 900, (ii) that that method 800 is scheduled to be initiated at defined times or time intervals, or (iii) that a new installation of construction document management cloud system 105 is installed. The method 800 initiates at START block 905 in response to parsing a signal received or stored data retrieved and determining that the signal or stored data indicates that the method 800 should begin. Processing continues to process block 910.

At process block 910, the processor collects a training set of digital action items that includes both digital action items correctly labeled as true and digital action items that are unlabeled as to whether or not they are true from a database.

In one embodiment, the processor retrieves a pre-configured training set of digital action items that includes both digital action items correctly labeled as true and digital action items that are unlabeled as to whether or not they are true from storage. As above, the digital action items—represented by training data structures—are in the same format as the candidate action item data structure. The training data structures need not have an assigned workflow class, because this training set is used to train a filter learning model and is not used to train an assignment learning model. In one embodiment, the action items correctly labeled as true may be historical action items gathered from a construction document management cloud system as described above with reference to process block 810 of method 800. In one embodiment, the unlabeled action items may be extracted from one or more project manual files in substantially the same manner as described with reference to process blocks 505 through 515 of method 500. Action items of both types (positive and unlabeled) are stored as training data structures are added to a training data set structure in storage.

Once the processor has thus completed collecting a training set of digital action items that includes both digital action items correctly labeled as true and digital action items that are unlabeled as to whether or not they are true from a database, processing at process block 910 completes, and processing continues to process block 915.

At process block 915, the processor trains the first machine learning model to recognize true action items with the training set in substantially the same manner as in substantially the same manner as the processor trains the first machine learning model with user inputs that change the label of an action item to 'a true action item' in process block 620 of method 600.

Once the processor has thus completed train the first machine learning model to recognize true action items with the training set, processing at process block 915 completes, and processing continues to END block 920, where process 900 ends.

Selected Benefits

The systems and methods described herein exhibit significant improvements in accuracy of automated action item (action item) extraction. Static automated action item extraction processes could, at best, be made to yield 60% to 65% accurate results, due at least in part to the need to err on the side of including, rather than excluding, action items. This appears to be a stagnation point for static automated action item extraction. Further improvement in accuracy in static automated action item extraction results in unacceptably excluding true action items. The systems and methods herein vastly improve the accuracy of automated action item extraction: the systems and methods described herein allow a computer to perform automated action item extraction with accuracy exceeding 90%. Further, as the filter model is trained over time, that accuracy can approach 100% accuracy.

Additionally, prior automated action item extraction does not automatically allocate extracted action items to a workflow classification. The increased accuracy in identifying true action items described above further enable true action items to be automatically categorized into one or more appropriate workflow classes, where lesser accuracy would hinder or even prevent such automation. Further, the increased accuracy enables the workflow assignment to be performed in a single pass with the extraction, further improving the performance of the computer in performing automated action item extraction due to eliminating computing resource overhead and latencies associated with the multiple pass.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

Computing Device Embodiment

Figure 10:
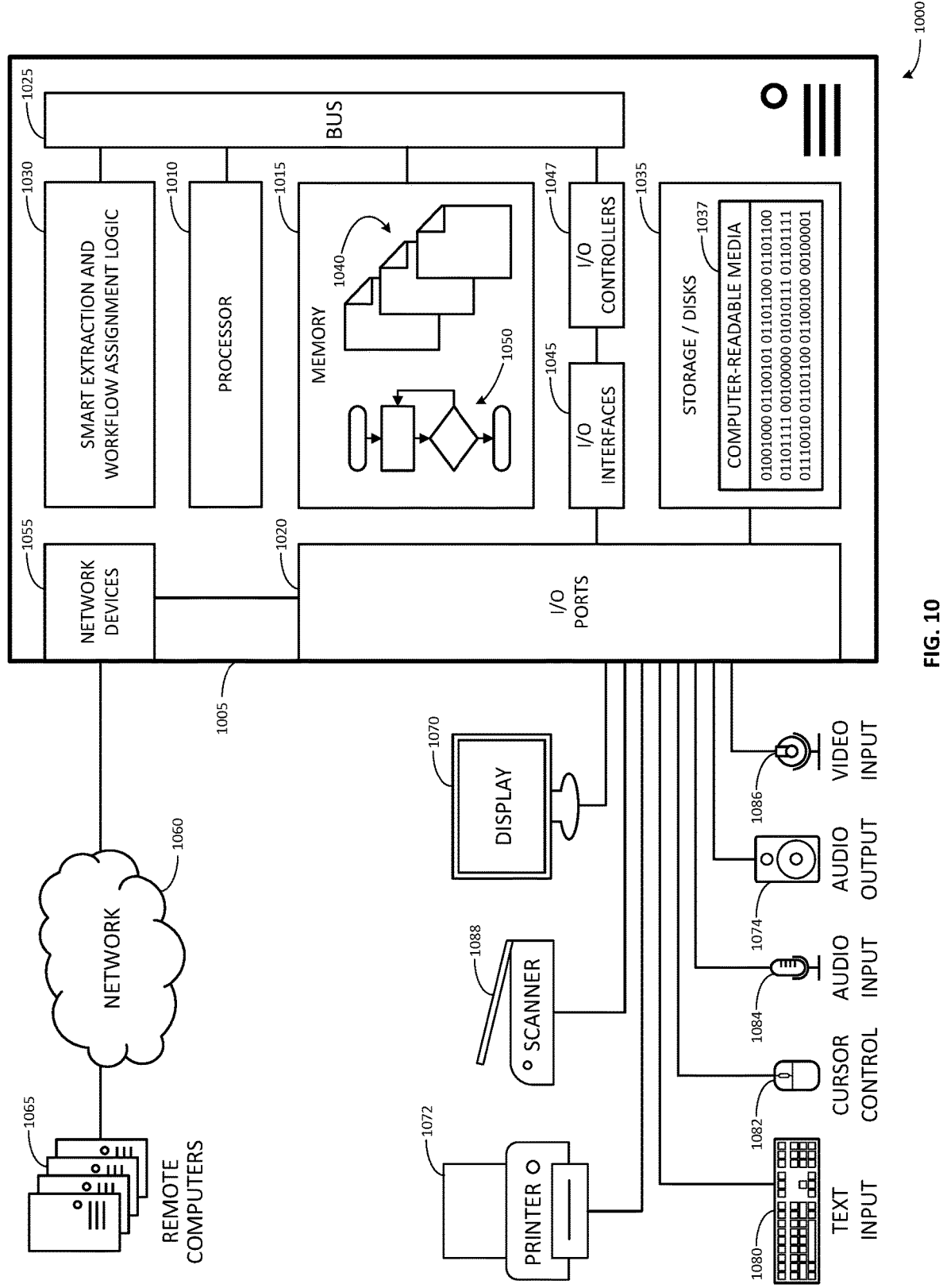
FIG. 10 illustrates an example computing device that is configured and/or programmed with one or more of the example systems and methods described herein, and/or equivalents.

FIG. 10 illustrates an example computing system 1000 that is configured and/or programmed as a special purpose computing device with one or more of the example systems and methods described herein, and/or equivalents. The example computing device may be a computer 1005 that includes a processor 1010, a memory 1015, and input/output ports 1020 operably connected by a bus 1025. In one example, the computer 1005 may include smart extraction and workflow assignment logic 1030 configured to facilitate automatic smart extraction and workflow assignment of action items from construction project manuals similar to the logic, systems, and methods shown and described with reference to FIGS. 1-9. In different examples, the smart extraction and workflow assignment logic 1030 may be implemented in hardware, a non-transitory computer-readable medium with stored instructions, firmware, and/or combinations thereof. While the smart extraction and workflow assignment logic 1030 is illustrated as a hardware component attached to the bus 1025, it is to be appreciated that in other embodiments, the smart extraction and workflow assignment logic 1030 could be implemented in the processor 1010, stored in memory 1015, or stored in disk 1035 on computer-readable media 1037.

In one embodiment, smart extraction and workflow assignment logic 1030 or the computing system 1000 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform automatic smart extraction and workflow assignment of action items from construction project manuals. The means may also be implemented as stored computer executable instructions that are presented to computer 1005 as data 1040 that are temporarily stored in memory 1015 and then executed by processor 1010.

Smart extraction and workflow assignment logic 1030 may also provide means (e.g., hardware, non-transitory computer-readable medium that stores executable instructions, firmware) for performing automatic smart extraction and workflow assignment of action items from construction project manuals.

Generally describing an example configuration of the computer 1005, the processor 1010 may be a variety of various processors including dual microprocessor and other multi-processor architectures. A memory 101015 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1035 may be operably connected to the computer 1005 by way of, for example, an input/output (I/O) interface (for example, a card or device) 1045 and an input/output port 1020 that are controlled by at least an input/output (I/O) controller 1047. The disk 1035 may be, for example, a magnetic disk drive, a solid-state disk drive, a floppy disk drive, a tape drive, a Zip drive, a flash memory card, a memory stick, and so on. Furthermore, the disk 1035 may be a CD-ROM drive, a CD-R drive, a CD-RW drive, a DVD ROM, and so on. The memory 1015 can store a process 1050 and/or data 1040 formatted as one or more data structures, for example. The disk 1035 and/or the memory 1015 can store an operating system that controls and allocates resources of the computer 1005.

The computer 1005 may interact with, control, and/or be controlled by input/output (I/O) devices via the input/output (I/O) controller 1047, the I/O interfaces 1045 and the input/output ports 1020. The input/output devices include one or more displays 1070, printers 1072 (such as inkjet, laser, or 3D printers), and audio output devices 1074 (such as speakers or headphones), text input devices 1080 (such as keyboards), a pointing and selection device 1082 (such as mice, trackballs, touchpads, touch screens, joysticks, pointing sticks, stylus mice), audio input devices 1084 (such as microphones), video input devices 1086 (such as video and still cameras), scanners 1088, video cards (not shown), disk 1035, network devices 1055, and so on. The input/output ports 1020 may include, for example, serial ports, parallel ports, and USB ports.

The computer 1005 can operate in a network environment and thus may be connected to the network devices 1055 via the I/O interfaces 1045, and/or the I/O ports 1020. Through the network devices 1055, the computer 1005 may interact with a network 1060. Through the network 1060, the computer 1005 may be logically connected to remote computers 1065. Networks with which the computer 1005 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions for automatic extraction and assignment of action items that, when executed by at least a processor of a computer, cause the computer to:
    extract one or more portions of a natural language text to be candidate action items in a set of candidate actions, wherein the extraction is based on determining that the portions of the text satisfy patterns consistent with presence of an action item;
    apply one or more static rules to the candidate action items to distinguish valid candidate action items that are consistent with extraction from a document composed in accordance with a standard and invalid candidate action items that are inconsistent with extraction from the document composed in accordance with the standard;
    evaluate the valid candidate action items with a first machine learning model trained to identify action items to determine the valid candidate action items to be one of either
    (i) a true action item that is an actual action item or
    (ii) not a true action item that is not actually an action item,
    wherein the first machine learning model is trained using action items that are correctly labeled as true action items;
    evaluate the true action items with a second machine learning model to allocate the true action items to workflow classes, wherein the second machine learning model performs multiple class classification of the true action items to make the allocation; and
    transmit the true action items to a submittal exchange system to populate one or more workflows.

2. The non-transitory computer readable medium of claim 1, wherein the instructions further cause the computer to:
    generate a graphical user interface configured to present the candidate action items for user review of the determinations and workflow class allocations of the candidate action items;
    accept one or more user inputs through the graphical user interface that corrects one or more of the determination or allocated workflow class of one or more of the candidate action items;
    train the first machine learning model in response to a user input that corrects the determination of one of the candidate action items to indicate that the candidate action item is a true action item; and
    train the second machine learning model in response to a user input that corrects the allocated workflow class of one of the candidate action items.

3. The non-transitory computer readable medium of claim 2, wherein the instructions that cause the computer to generate the graphical user interface further cause the computer to:
    present each candidate action item labeled as determined to be a true action item in a row that includes a selectable button which when selected changes a label of the candidate action item of the row to indicate that the candidate action item is not a true action item; and
    present each candidate action item labeled as determined to be not a true action item in a row (i) where text in the row is struck through or the background is shaded to indicate that the candidate action item is not a true action item, and (ii) that includes a selectable button which when selected changes a label of the action item of that row to indicate that the candidate action item is a true action item.

4. The non-transitory computer readable medium of claim 2, wherein the instructions that cause the computer to generate the graphical user interface further cause the computer to present a selectable menu for a workflow class field in at least one row, which when a different menu option is selected changes the allocated workflow class of the action item of that row.

5. The non-transitory computer readable medium of claim 1, wherein the instructions further cause the computer to:
    accept one or more user inputs to correct one or more of the determination or allocated workflow class of one or more action items extracted from text of a construction project manual;
    train the first machine learning model in response to each user input that corrects the determinations of an action item extracted from the text of the construction project manual; and
    train the second machine learning model in response to each user input that corrects the allocated workflow class of the action item extracted from the text of the construction project manual.

6. The non-transitory computer readable medium of claim 1, wherein the instructions further cause the computer to:
    collect a training set of digital action items correctly labeled as determined to be true and correctly allocated to a workflow class from a database;
    train the first machine learning model to recognize true action items with the training set; and
    train the second machine learning model to allocate action items using the training set.

7. The non-transitory computer readable medium of claim 1, wherein the instructions further cause the computer to:
    collect a training set of digital action items that includes both digital action items correctly labeled as determined to be true and digital action items that are unlabeled as to whether or not they are true from a database; and
    train the first machine learning model to recognize true action items with the training set.

8. The non-transitory computer readable medium of claim 1, wherein the natural language text is a construction project manual written in natural language, and the instructions further causing the computer to write each extracted candidate action item in a standardized format including a section number, section title, and expected item field to a network-based non-transitory storage device.

9. A computer-implemented method for automatic extraction and assignment of action items, the method comprising:
   extracting, by at least a processor, a set of candidate action items from a text, wherein the extraction is based on determining that portions of the text satisfy patterns consistent with presence of an action item;
   applying, by at least the processor, one or more static rules to the candidate action items to distinguish valid candidate action item that are consistent with extraction from a document composed in accordance with a specification-writing standard and invalid candidate action items that are inconsistent with extraction from the document composed in accordance with the specification-writing standard;
   evaluating, by at least the processor, the valid candidate action items with a first machine learning model trained to identify action items to determine the valid candidate action items to be either
      (i) a true action item or
      (ii) not a true action item,
      wherein the first machine learning model is trained using action items that are correctly labeled as true action items;
   evaluating, by at least the processor, the true action items with a second machine learning model to allocate the true action items to workflow classes, wherein the second machine learning model performs multiple class classification of the true action items to make the allocation; and
   transmitting, by at least the processor, the true action items to a submittal exchange system to populate one or more workflows.

10. The method of claim 9, further comprising:
    generating, by at least the processor, a graphical user interface configured to present the candidate action items for user review of the determinations and workflow class allocations of the candidate action items;
    accepting, by at least the processor, one or more user inputs through the graphical user interface that corrects one or more of the determination or allocated workflow class of one or more of the candidate action items;
    training, by at least the processor, the first machine learning model in response to a user input that corrects the determination of one of the candidate action items to indicate that the candidate action item is a true action item; and
    training, by at least the processor, the second machine learning model in response to a user input that corrects the allocated workflow class of one of the candidate action items.

11. The method of claim 10, wherein the generation of the graphical user interface further comprises:
    presenting each candidate action item labeled as determined to be a true action item in a row that includes a selectable button which when selected changes a label of the candidate action item of the row to indicate that the candidate action item is not a true action item; and
    presenting each candidate action item labeled as determined to be not a true action item in a row (i) where text in the row is struck through or the background is shaded to indicate that the candidate action item is not a true action item, and (ii) that includes a selectable button which when selected changes a label of the action item of that row to indicate that the candidate action item is a true action item.

12. The method of claim 10, wherein the generation of the graphical user interface further comprises presenting a selectable menu for a workflow class field in at least one row, which when a different menu option is selected changes the allocated workflow class of the action item of that row.

13. The method of claim 9, further comprising:
    accepting, by at least the processor, one or more user inputs to correct one or more of the determinations or allocated workflow class of one or more action items extracted from text of a construction project manual;
    training, by at least the processor, the first machine learning model in response to each user input that corrects the determinations of an action item extracted from the text of the construction project manual; and
    training, by at least the processor, the second machine learning model in response to each user input that corrects the allocated workflow class of the action item extracted from the text of the construction project manual.

14. The method of claim 9, further comprising:
    collecting, by at least the processor, a training set of digital action items correctly labeled as determined to be true and correctly allocated to a workflow class from a database;
    training, by at least the processor, the first machine learning model to recognize true action items with the training set; and
    training, by at least the processor, the second machine learning model to allocate action items using the training set.

15. A computing system for automatic extraction and assignment of action items, the system comprising:
    a processor;
    a memory operably connected to the processor;
    a non-transitory computer-readable medium operably connected to the processor and memory and storing computer-executable instructions that when executed by at least the processor cause the computing system to:
        extract one or more portions of a natural language text to be candidate action items in a set of candidate action items;
        apply one or more static rules to the candidate action items to distinguish valid candidate action items that are consistent with extraction from a document composed in accordance with a standard and invalid candidate action items that are inconsistent with extraction from the document composed in accordance with the standard;
        evaluate the valid candidate action item with a first machine learning model trained to identify action items to label the valid candidate action item as one of either
            (i) a true action item or
            (ii) not a true action item,
            wherein the first machine learning model is trained using action items that are correctly labeled as true action items;
        evaluate the true action items with a second machine learning model to allocate the true action items to workflow classes, wherein the second machine learning model performs multiple class classification of the true action items to make the allocation; and
        transmit the true action items to a submittal exchange system to populate one or more workflows.

16. The computing system of claim 15, wherein the non-transitory computer-readable medium further comprises instructions that when executed by at least the processor cause the computing system to:
- generate a graphical user interface configured to present the candidate action items for user review of the labels and workflow class allocations of the candidate action items;
- accept one or more user inputs through the graphical user interface that corrects one or more of the label or allocated workflow class of one or more of the candidate action items;
- train the first machine learning model in response to a user input that corrects the label of one of the candidate action items to indicate that the candidate action item is a true action item; and
- train the second machine learning model in response to a user input that corrects the allocated workflow class of one of the candidate action items.

17. The computing system of claim 16, wherein the non-transitory computer-readable medium comprises further instructions to generate the graphical user interface that when executed by at least the processor cause the computing system to:
- present each candidate action item labeled as a true action item in a row that includes a selectable button which when selected changes the label of the candidate action item of the row to indicate that the candidate action item is not a true action item;
- present each candidate action item labeled as not a true action item in a row (i) where text in the row is struck through or the background is shaded to indicate that the candidate action item is not a true action item, and (ii) that includes a selectable button which when selected changes the label of the action item of that row to indicate that the candidate action item is a true action item;
- present a selectable menu for a workflow class field in at least one row, which when a different menu option is selected changes the allocated workflow class of the candidate action item of that row.

18. The computing system of claim 15, wherein the non-transitory computer-readable medium further comprises instructions that when executed by at least the processor cause the computing system to:
- accept one or more user inputs to correct one or more of the label or allocated workflow class of one or more action items extracted from text of a construction project manual;
- train the first machine learning model in response to each user input that corrects the label of an action item extracted from the text of the construction project manual; and
- train the second machine learning model in response to each user input that corrects the allocated workflow class of the action item extracted from the text of the construction project manual.

19. The computing system of claim 15, wherein the non-transitory computer-readable medium further comprises instructions that when executed by at least the processor cause the computing system to:
- collect a training set of digital action items correctly labeled as true and correctly allocated to a workflow class from a database;
- train the first machine learning model to recognize true action items with the training set; and
- train the second machine learning model to allocate action items using the training set.

20. The computing system of claim 15, wherein the natural language text is a construction project manual written in natural language, and the non-transitory computer-readable medium further comprises instructions that when executed by at least the processor cause the computing system to write each extracted candidate action item in a standardized format including a section number, section title, and expected item field to a network-based non-transitory storage device.

* * * * *

UNITED STATES PATENT AND TRADEMARK OFFICE
CERTIFICATE OF CORRECTION

PATENT NO. : 11,625,660 B2
APPLICATION NO. : 17/003216
DATED : April 11, 2023
INVENTOR(S) : Goli et al.

It is certified that error appears in the above-identified patent and that said Letters Patent is hereby corrected as shown below:

On the Title Page

Column 1, under Inventors, Line 3, delete "Vijayawanda" and insert -- Vijayawada --, therefor.

In the Claims

In Column 42, Line 35, in Claim 5, delete "determination" and insert -- determinations --, therefor.

Signed and Sealed this
Sixteenth Day of April, 2024

Katherine Kelly Vidal
*Director of the United States Patent and Trademark Office*